(12) United States Patent
Krull et al.

(10) Patent No.: US 8,899,043 B2
(45) Date of Patent: Dec. 2, 2014

(54) OCEAN THERMAL ENERGY CONVERSION PLANT

(75) Inventors: Russ Krull, Centreville, VA (US); Laurence Jay Shapiro, Fair Lawn, NJ (US); Jonathan M. Ross, Arnold, MD (US)

(73) Assignee: The Abell Foundation, Inc., Baltimore, MD (US)

( * ) Notice: Subject to any disclaimer, the term of this patent is extended or adjusted under 35 U.S.C. 154(b) by 783 days.

(21) Appl. No.: 12/691,663

(22) Filed: Jan. 21, 2010

(65) Prior Publication Data

US 2011/0173979 A1 Jul. 21, 2011

(51) Int. Cl.
*F03G 7/04* (2006.01)
*F03G 7/05* (2006.01)

(52) U.S. Cl.
CPC .. *F03G 7/05* (2013.01); *Y02E 10/34* (2013.01)
USPC ............................ 60/641.7; 60/641.6; 60/655

(58) Field of Classification Search
USPC ..................................... 60/641.6, 641.7, 655
See application file for complete search history.

(56) References Cited

U.S. PATENT DOCUMENTS

| | | | |
|---|---|---|---|
| 2,038,172 A | 4/1936 | Haley | |
| 2,263,182 A | 11/1941 | MacPherson | |
| 2,648,217 A | 8/1953 | Gladville | |
| 2,900,175 A | 8/1959 | McGuffey | |
| 3,095,014 A | 6/1963 | Dosker | |
| 3,246,689 A | 4/1966 | Remde et al. | |
| 3,312,056 A | 4/1967 | Lagelbauer | |
| 3,524,476 A | 8/1970 | Thomas | |
| 3,538,955 A | 11/1970 | Anderson | |
| 3,558,439 A | 1/1971 | Anderson | |
| 3,599,589 A | 8/1971 | Busey | |
| 3,795,103 A | 3/1974 | Anderson | |
| 3,805,515 A | 4/1974 | Zener | |
| 4,002,200 A | 1/1977 | Raskin | |
| 4,006,619 A | 2/1977 | Anderson | |
| 4,014,279 A * | 3/1977 | Pearson | 114/382 |
| 4,030,301 A | 6/1977 | Anderson | |
| 4,036,286 A | 7/1977 | Anderson et al. | |

(Continued)

FOREIGN PATENT DOCUMENTS

| | | |
|---|---|---|
| EP | 0908382 | 4/1999 |
| JP | 61-149507 | 7/1986 |

(Continued)

OTHER PUBLICATIONS

Avery, William H. et al., "Renewable Energy From the Ocean—A Guide to OTEC", The John's Hopkins University—Applied Physics Laboratory Series in Science and Engineering (1994).

(Continued)

*Primary Examiner* — Hoang Nguyen
(74) *Attorney, Agent, or Firm* — Fish & Richardson P.C.

(57) ABSTRACT

An offshore power generation structure comprising a submerged portion having a first deck portion comprising an integral multi-stage evaporator system, a second deck portion comprising an integral multi-stage condensing system, a third deck portion housing power generation equipment, cold water pipe; and a cold water pipe connection. The heat exchangers in the evaporator and condenser systems include a multi-stage cascading heat exchange system. Warm water conduits in the first deck portion and cold water conduits in the second deck portion are integral to the structure of the submerged portion of the offshore platform.

24 Claims, 11 Drawing Sheets

(56) References Cited

U.S. PATENT DOCUMENTS

| | | |
|---|---|---|
| 4,048,943 A | 9/1977 | Gerwick, Jr. |
| 4,055,145 A | 10/1977 | Mager et al. |
| 4,087,975 A | 5/1978 | Owens |
| 4,131,159 A | 12/1978 | Long |
| 4,139,054 A | 2/1979 | Anderson |
| 4,201,263 A | 5/1980 | Anderson |
| 4,209,061 A | 6/1980 | Schwemin |
| 4,209,991 A | 7/1980 | Anderson |
| 4,210,819 A | 7/1980 | Wittig et al. |
| 4,210,820 A | 7/1980 | Witting |
| 4,229,868 A | 10/1980 | Kretzinger |
| 4,231,312 A | 11/1980 | Person |
| 4,231,420 A | 11/1980 | Anderson |
| 4,234,269 A | 11/1980 | Person et al. |
| 4,254,626 A | 3/1981 | Anderson |
| 4,265,301 A | 5/1981 | Anderson |
| 4,281,614 A | 8/1981 | McNary et al. |
| 4,282,834 A | 8/1981 | Anderson |
| 4,290,631 A | 9/1981 | Anderson |
| 4,301,375 A | 11/1981 | Anderson |
| 4,334,965 A | 6/1982 | Wu |
| 4,350,014 A * | 9/1982 | Sanchez et al. ............... 60/641.7 |
| 4,358,225 A | 11/1982 | van der Pot et al. |
| 4,363,570 A | 12/1982 | van der Pot |
| 4,384,459 A | 5/1983 | Johnston |
| 4,417,446 A | 11/1983 | Nakamoto et al. |
| 4,497,342 A | 2/1985 | Wenzel et al. |
| 4,548,043 A | 10/1985 | Kalina |
| 4,578,953 A | 4/1986 | Krieger et al. |
| 4,628,212 A | 12/1986 | Uehara et al. |
| 4,700,543 A | 10/1987 | Krieger et al. |
| 4,753,554 A | 6/1988 | Jeter |
| 4,823,867 A | 4/1989 | Pollard et al. |
| 4,871,017 A | 10/1989 | Cesaroni |
| 5,057,217 A | 10/1991 | Lutz et al. |
| 5,076,354 A | 12/1991 | Nishishita |
| 5,101,890 A | 4/1992 | Aoki et al. |
| 5,104,263 A | 4/1992 | Shibahara et al. |
| 5,123,772 A | 6/1992 | Anderson |
| 5,441,489 A | 8/1995 | Utsumi et al. |
| 5,555,838 A | 9/1996 | Bergman |
| 5,582,691 A | 12/1996 | Flynn et al. |
| 5,656,345 A | 8/1997 | Strand et al. |
| 5,769,155 A | 6/1998 | Ohadi et al. |
| 5,983,624 A | 11/1999 | Anderson |
| 6,167,693 B1 | 1/2001 | Anderson |
| 6,293,734 B1 | 9/2001 | Thomas et al. |
| 6,301,872 B1 | 10/2001 | Anderson |
| 6,347,912 B1 | 2/2002 | Thomas |
| 6,406,223 B1 | 6/2002 | Thomas |
| 6,451,204 B1 | 9/2002 | Anderson |
| 6,472,614 B1 | 10/2002 | Dupont et al. |
| 6,481,197 B2 | 11/2002 | Anderson |
| 6,553,752 B2 | 4/2003 | Anderson |
| 6,634,853 B1 | 10/2003 | Anderson |
| 6,663,343 B1 | 12/2003 | Anderson |
| 6,718,901 B1 | 4/2004 | Abbott et al. |
| 6,843,278 B2 | 1/2005 | Espinasse |
| 6,848,863 B2 | 2/2005 | Karayaka et al. |
| 7,197,999 B2 | 4/2007 | Murray |
| 7,243,716 B2 | 7/2007 | Denniel et al. |
| 7,328,578 B1 | 2/2008 | Saucedo |
| 7,431,623 B1 | 10/2008 | Saucedo et al. |
| 7,472,742 B2 | 1/2009 | Kumar et al. |
| 7,600,569 B2 | 10/2009 | Routeau et al. |
| 7,735,321 B2 | 6/2010 | Howard |
| 7,882,703 B2 | 2/2011 | Pellen |
| 7,900,452 B2 | 3/2011 | Howard et al. |
| 8,025,834 B2 | 9/2011 | Miller et al. |
| 8,043,027 B2 | 10/2011 | Duroch et al. |
| 8,070,388 B2 | 12/2011 | Thomas |
| 8,070,389 B2 | 12/2011 | Ayers et al. |
| 8,083,902 B2 | 12/2011 | Al-Garni et al. |
| 8,096,589 B2 | 1/2012 | De Aquino et al. |
| 8,100,150 B2 | 1/2012 | Jung et al. |
| 8,117,843 B2 | 2/2012 | Howard et al. |
| 8,123,226 B2 | 2/2012 | Bell et al. |
| 8,146,362 B2 | 4/2012 | Howard et al. |
| 8,152,949 B2 | 4/2012 | Bailey et al. |
| 8,172,481 B2 | 5/2012 | Luppi |
| 8,182,176 B2 | 5/2012 | Bailey et al. |
| 8,250,847 B2 | 8/2012 | Rapp et al. |
| 8,256,469 B2 | 9/2012 | Felix-Henry |
| 8,282,315 B2 | 10/2012 | Espinasse et al. |
| 8,286,516 B2 | 10/2012 | Routeau et al. |
| 8,353,162 B2 | 1/2013 | Nagurny |
| 8,424,307 B2 | 4/2013 | Hsu et al. |
| 8,444,182 B2 | 5/2013 | Kuo et al. |
| 2002/0168232 A1 | 11/2002 | Xu et al. |
| 2003/0172758 A1 | 9/2003 | Anderson |
| 2003/0221603 A1 | 12/2003 | Horton |
| 2005/0155749 A1 | 7/2005 | Memory et al. |
| 2006/0231344 A1 | 10/2006 | Drzewiecki |
| 2007/0028626 A1 | 2/2007 | Chen |
| 2007/0289303 A1 | 12/2007 | Prueitt |
| 2008/0025799 A1 | 1/2008 | Kawasaki |
| 2008/0295517 A1 | 12/2008 | Howard et al. |
| 2009/0013690 A1 | 1/2009 | Marshall |
| 2009/0077969 A1 | 3/2009 | Prueitt |
| 2009/0158987 A1 | 6/2009 | Ramachandran et al. |
| 2009/0178722 A1 | 7/2009 | Howard |
| 2009/0217664 A1 | 9/2009 | Rapp et al. |
| 2009/0294110 A1 | 12/2009 | Foust |
| 2009/0301088 A1 | 12/2009 | Kuo et al. |
| 2009/0308582 A1 | 12/2009 | Nagurny et al. |
| 2010/0139272 A1 | 6/2010 | Howard et al. |
| 2010/0180924 A1 | 7/2010 | Bailey et al. |
| 2010/0275597 A1 | 11/2010 | Kuo |
| 2011/0079375 A1 | 4/2011 | Nagurny et al. |
| 2011/0120636 A1 | 5/2011 | Bailey et al. |
| 2011/0127022 A1 | 6/2011 | Eller et al. |
| 2011/0173978 A1 | 7/2011 | Rekret et al. |
| 2011/0173979 A1 | 7/2011 | Krull et al. |
| 2011/0272864 A1 | 11/2011 | Miller et al. |
| 2011/0293379 A1 | 12/2011 | Halkyard et al. |
| 2012/0011849 A1 | 1/2012 | Cole et al. |
| 2012/0043755 A1 | 2/2012 | Van Ryzin et al. |
| 2012/0073291 A1 | 3/2012 | Shapiro et al. |
| 2012/0080164 A1 | 4/2012 | Nagurny et al. |
| 2012/0080175 A1 | 4/2012 | Levings et al. |
| 2012/0125561 A1 | 5/2012 | Levings et al. |
| 2012/0167813 A1 | 7/2012 | Lambrakos et al. |
| 2012/0183356 A1 | 7/2012 | Risi et al. |
| 2012/0186781 A1 | 7/2012 | Dreyer et al. |
| 2012/0195690 A1 | 8/2012 | Luo et al. |
| 2012/0199335 A1 | 8/2012 | Maurer |
| 2012/0201611 A1 | 8/2012 | Flores, Sr. et al. |
| 2012/0207600 A1 | 8/2012 | Harris et al. |
| 2012/0216737 A1 | 8/2012 | Luo et al. |
| 2012/0234597 A1 | 9/2012 | Madden |
| 2012/0241040 A1 | 9/2012 | Fogg |
| 2012/0257931 A1 | 10/2012 | Tkaczyk et al. |
| 2013/0037601 A1 | 2/2013 | Eller et al. |
| 2013/0153171 A1 | 6/2013 | Nagurny et al. |

FOREIGN PATENT DOCUMENTS

| | | |
|---|---|---|
| JP | 02-271080 | 11/1990 |
| JP | 05-288481 | 11/1993 |
| WO | WO 2011/091295 | 7/2011 |

OTHER PUBLICATIONS

Kang, Tack Jung, "International Search Report", International Application No. PCT/US2011/044015, mailed on Mar. 22, 2012 (3 pages).

Kang, Tack Jung, "Written Opinion of the International Searching Authority", International Application No. PCT/US2011/044015, mailed on Mar. 22, 2012 (4 pages).

Lindner, Nora, Notification Concerning Transmittal of International Preliminary Report on Patentability (Chapter I of the Patent Cooperation Treaty), International Application No. PCT/US2011/044015, mailed on Jan. 24, 2013 (6 pages).

Sun, Kim, "International Search Report", International Application No. PCT/US2012/050954, mailed on Feb. 15, 2013 (3 pages).

(56) References Cited

OTHER PUBLICATIONS

Sun, Kim, "Written Opinion of the International Searching Authority", International Application No. PCT/US2012/050954, mailed on Feb. 15, 2013 (5 pages).
Sun, Kim, "International Search Report", International Application No. PCT/US2012/050933, mailed on Feb. 15, 2013 (3 pages).
Sun, Kim, "Written Opinion of the International Searching Authority", International Application No. PCT/US2012/050933, mailed on Feb. 15, 2013 (5 pages).
Han, Joong Sub, "International Search Report", International Application No. PCT/US2012/050941, mailed on Feb. 27, 2013 (3 pages).
Han, Joong Sub, "Written Opinion of the International Searching Authority", International Application No. PCT/US2012/050941, mailed on Feb. 27, 2013 (5 pages).
Avery, William H. et al., "Renewable Energy From the Ocean—A Guide to OTEC", The John's Hopkins University—Applied Physics Laboratory Series in Science and Engineering (1994) (244 pages).
USPTO Office Action; Apr. 5, 2013; U.S. Appl. No. 12/691,655; 13 pp.
USPTO Office Action; Feb. 8, 2013; U.S. Appl. No. 13/011,619; 33 pp.
USPTO Office Action; Apr. 26, 2013; U.S. Appl. No. 13,183,047; 22 pp.
USPTO Office Action; Jul. 1, 2013; U.S. Appl. No. 13/209,865; 36 pp.
USPTO Office Action, Apr. 26, 2013; U.S. Appl. No. 13/209,893; 31 pp.
English translation; JP 61-149507; Jul. 1986; 12 pp.
Lindner, Nora, "Notification Concerning Transmittal of International Preliminary Report on Patentability (Chapter I of the Patent Cooperation Treaty)", International Application No. PCT/US2011/022115, mailed Jul. 24, 2012 (7 pages).
Han, Joong Sub, "International Search Report", International Application No. PCT/US2013/065098, mailed on Jan. 21, 2014 (3 pages).
Han, Joong Sub, "Written Opinion of the International Searching Authority", International Application No. PCT/US2013/065098, mailed Jan. 21, 2014 (3 pages).
Nguyen, Hoang M., "USPTO Office Action", U.S. Appl. No. 12/691,655, mailed Sep. 16, 2013 (10 pages).
Wan, Deming, "USPTO Final Office Action", U.S. Appl. No. 13/209,893, mailed Oct. 9, 2013(19 pages).
Harris, Wesley G., "USPTO Final Office Action", U.S. Appl. No. 13/183,047, mailed Dec. 19, 2013 (10 pages).
Mian, Shafiq A., "USPTO Final Office Action", U.S. Appl. No. 13/011,619, mailed Oct. 25, 2013 (16 pages).
Dounis, Laert, "USPTO Final Office Action", U.S. Appl. No. 13/209,865, mailed Apr. 2, 2014 (36 pages).
Nguyen, Hoang M., "USPTO Final Office Action", U.S. Appl. No. 12/691,655, mailed Mar. 31, 2014 (13 pages).
Wan, Deming, "USPTO Office Action", U.S. Appl. No. 13/209,893, mailed May 20, 2014 (21 pages).
Mian, Shafiq A. "USPTO Non-Final Office Action", U.S. Appl. No. 13/011,619, mailed Jun. 6, 2014 (17 pages).
Leo, Leonard R., "USPTO Non-Final Office Action", U.S. Appl. No. 13/209,944, mailed Jun. 18, 2014 (14 pages).
Nakamura, Yukari, "International Preliminary Report on Patentability (Chapter I of the Patent Cooperation Treaty)", International Application No. PCT/US2012/050954, issued on Feb. 18, 2014 (7 pages).
Nickitas-Etienee, Athina, "International Preliminary Report on Patentability (Chapter I of the Patent Cooperation Treaty)", International Application No. PCT/US2012/050941, issued on Feb. 18, 2014 (7 pages).

\* cited by examiner

OCEAN THERMAL ENERGY CONVERSION PLANT

TECHNICAL FIELD

This invention relates to ocean thermal energy conversion power plants and more specifically to floating minimum heave platform, multi-stage heat engine, ocean thermal energy conversion power plants.

BACKGROUND

Energy consumption and demand throughout the world has grown at an exponential rate. This demand is expected to continue to rise, particularly in developing countries in Asia and Latin America. At the same time, traditional sources of energy, namely fossil fuels, are being depleted at an accelerating rate and the cost of exploiting fossil fuels continues to rise. Environmental and regulatory concerns are exacerbating that problem.

Solar-related renewable energy is one alternative energy source that may provide a portion of the solution to the growing demand for energy. Solar-related renewable energy is appealing because, unlike fossil fuels, uranium, or even thermal "green" energy, there are few or no climatic risks associated with its use. In addition, solar related energy is free and vastly abundant.

Ocean Thermal Energy Conversion ("OTEC") is a manner of producing renewable energy using solar energy stored as heat in the oceans' tropical regions. Tropical oceans and seas around the world offer a unique renewable energy resource. In many tropical areas (between approximately 20° north and 20° south latitude) the temperature of the surface sea water remains nearly constant. To depths of approximately 100 ft the average surface temperature of the sea water varies seasonally between 75° F. and 85° F. or more. In the same regions, deep ocean water (between 2500 ft and 4200 ft or more) remains a fairly constant 40° F. Thus, the tropical ocean structure offers a large warm water reservoir at the surface and a large cold water reservoir at depth, with a temperature difference between the warm and cold reservoirs of between 35° F. to 45° F. This temperature difference ($\Delta T$) remains fairly constant throughout the day and night, with small seasonal changes.

The OTEC process uses the temperature difference between surface and deep sea tropical waters to drive a heat engine to produce electrical energy. OTEC power generation was identified in the late 1970's as a possible renewable energy source having a low to zero carbon footprint for the energy produced. An OTEC power plant, however, has a low thermodynamic efficiency compared to more traditional, high pressure, high temperature power generation plants. For example, using the average ocean surface temperatures between 80° F. and 85° F. and a constant deep water temperature of 40° F., the maximum ideal Carnot efficiency of an OTEC power plant will be 7.5 to 8%. In practical operation, the gross power efficiency of an OTEC power system has been estimated to be about half the Carnot limit, or approximately 3.5 to 4.0%. Additionally, analysis performed by leading investigators in the 1970's and 1980's, and documented in William Avery and Chih Wu, "Renewable Energy from the Ocean, a Guide to OTEC," Oxford University Press, 1994 (incorporated herein by reference), indicates that between one quarter to one half (or more) of the gross electrical power generated by an OTEC plant operating with a $\Delta T$ of 40° F. would be required to run the water and working fluid pumps and to supply power to other auxiliary needs of the plant. On this basis, the low overall net efficiency of an OTEC power plant converting the thermal energy stored in the ocean surface waters to net electric energy has not been a commercially viable energy production option.

An additional factor resulting in further reductions in overall thermodynamic efficiency is the loss associated with providing necessary controls on the turbine for precise frequency regulation. This introduces pressure losses in the turbine cycle that limit the work that can be extracted from the warm sea water. The resulting net plant efficiency would then be between 1.5% and 2.0%

This low OTEC net efficiency compared with efficiencies typical of heat engines that operate at high temperatures and pressures has led to the widely held assumption by energy planners that OTEC power is too costly to compete with more traditional methods of power production.

Indeed, the parasitic electrical power requirements are particularly important in an OTEC power plant because of the relatively small temperature difference between the hot and cold water. To achieve maximum heat transfer between the warm sea water and the working fluid, and between the cold sea water and the working fluid large heat exchange surface areas are required, along with high fluid velocities. Increasing any one of these factors can increase the parasitic load on the OTEC plant, thereby decreasing net efficiency. An efficient heat transfer system that maximizes the energy transfer in the limited temperature differential between the sea water and the working fluid would increase the commercial viability of an OTEC power plant.

In addition to the relatively low efficiencies with seemingly inherent large parasitic loads, the operating environment of OTEC plants presents design and operating challenges that also decrease the commercial viability of such operations. As previously mentioned, the warm water needed for the OTEC heat engine is found at the surface of the ocean, to a depth of 100 ft or less. The constant source of cold water for cooling the OTEC engine is found at a depth of between 2700 ft and 4200 ft or more. Such depths are not typically found in close proximity to population centers or even land masses. An offshore power plant is required.

Whether the plant is floating or fixed to an underwater feature, a long cold water intake pipe of 2000 ft or longer is required. Moreover, because of the large volume of water required in commercially viable OTEC operations, the cold water intake pipe requires a large diameter (typically between 6 and 35 feet or more). Suspending a large diameter pipe from an offshore structure presents stability, connection and construction challenges which have previously driven OTEC costs beyond commercial viability.

Additionally, a pipe having significant length to diameter ratio that is suspended in a dynamic ocean environment can be subjected to temperature differences and varying ocean currents along the length of the pipe. Stresses from bending and vortex shedding along the pipe also present challenges. And surface influences such as wave action present further challenges with the connection between the pipe and floating platform. A cold water pipe intake system having desirable performance, connection, and construction consideration would increase the commercial viability of an OTEC power plant.

Environmental concerns associated with an OTEC plant have also been an impediment to OTEC operations. Traditional OTEC systems draw in large volumes of nutrient rich cold water from the ocean depths and discharge this water at or near the surface. Such discharge can effect, in a positive or adverse manner, the ocean environment near the OTEC plant, impacting fish stocks and reef systems that may be down current from the OTEC discharge.

SUMMARY

Aspects of the present invention are directed to a power generation plant utilizing ocean thermal energy conversion processes.

Further Aspects of the invention relate to an offshore OTEC power plant having improved overall efficiencies with reduced parasitic loads, greater stability, lower construction and operating costs, and improved environmental footprint. Other aspects include large volume water conduits that are integral with the floating structure. Modularity and compartmentation of the multi-stage OTEC heat engine reduces construction and maintenance costs, limits off-grid operation and improves operating performance. Still further aspects provide for a floating platform having structurally integrated heat exchange compartments and provides for minimal movement of the platform due to wave action. The integrated floating platform may also provide for efficient flow of the warm water or cool water through the multi-stage heat exchanger, increasing efficiency and reducing the parasitic power demand. Aspects of the invention can promote an environmentally neutral thermal footprint by discharging warm and cold water at appropriate depth/temperature ranges. Energy extracted in the form of electricity reduces the bulk temperature to the ocean.

Further aspects of the invention relate to a floating, minimal heave OTEC power plant having an optimized multi-stage heat exchange system, wherein the warm and cold water supply conduits and heat exchanger cabinets are structurally integrated into the floating platform or structure of the power plant.

Still further aspects include a floating ocean thermal energy conversion power plant. A minimal heave structure, such as a spar, or modified semi-submersible offshore structure may comprise a first deck portion having structurally integral warm sea water passages, multi-stage heat exchange surfaces, and working fluid passages, wherein the first deck portion provides for the evaporation of the working fluid. A second deck portion is also provided having structurally integral cold sea water passages, multi-stage heat exchange surfaces, and working fluid passages, wherein the second deck portion provides a condensing system for condensing the working fluid from a vapor to a liquid. The first and second deck working fluid passages are in communication with a third deck portion comprising one or more vapor turbine driven electric generators for power generation.

In one aspect, an offshore power generation structure is provided comprising a submerged portion. The submerged portion further comprises a first deck portion comprising an integral multi-stage evaporator system, a second deck portion comprising an integral multi-stage condensing system; a third deck portion housing power generation and transformation equipment; a cold water pipe and a cold water pipe connection.

In a further aspect, the first deck portion further comprises a first stage warm water structural passage forming a high volume warm water conduit. The first deck portion also comprises a first stage working fluid passage arranged in cooperation with the first stage warm water structural passage to warm a working fluid to a vapor. The first deck portion also comprises a first stage warm water discharge directly coupled to a second stage warm water structural passage. The second stage warm water structural passage forms a high volume warm water conduit and comprises a second stage warm water intake coupled to the first stage warm water discharge. The arrangement of the first stage warm water discharge to the second stage warm water intake provides minimal pressure loss in the warm water flow between the first and second stage. The first deck portion also comprises a second stage working fluid passage arranged in cooperation with the second stage warm water structural passage to warm the working fluid to a vapor. The first deck portion also comprises a second stage warm water discharge.

In a further aspect, the submerged portion further comprises a second deck portion comprising a first stage cold water structural passage forming a high volume cold water conduit. The first stage cold water passage further comprises a first stage cold water intake. The second deck portion also comprises a first stage working fluid passage in communication with the first stage working fluid passage of the first deck portion. The first stage working fluid passage of the second deck portion in cooperation with the first stage cold water structural passage cools the working fluid to a liquid. The second deck portion also comprises a first stage cold water discharge directly coupled to a second stage cold water structural passage forming a high volume cold water conduit. The second stage cold water structural passage comprises a second stage cold water intake. The first stage cold water discharge and the second stage cold water intake are arranged to provide minimal pressure loss in the cold water flow from the first stage cold water discharge to the second stage cold water intake. The second deck portion also comprises a second stage working fluid passage in communication with the second stage working fluid passage of the first deck portion. The second stage working fluid passage in cooperation with the second stage cold water structural passage cool the working fluid within the second stage working fluid passage to a liquid. The second deck portion also comprises a second stage cold water discharge.

In a further aspect, the third deck portion may comprise a first and second vapor turbine, wherein the first stage working fluid passage of the first deck portion is in communication with the first turbine and the second stage working fluid passage of the first deck portion is in communication with the second turbine. The first and second turbine can be coupled to one or more electric generators.

In still further aspects, an offshore power generation structure is provided comprising a submerged portion, the submerged portion further comprises a four stage evaporator portion, a four stage condenser portion, a four stage power generation portion, a cold water pipe connection, and a cold water pipe.

In one aspect the four stage evaporator portion comprises a warm water conduit including, a first stage heat exchange surface, a second stage heat exchange surface, a third stage heat exchange surface, and fourth stage heat exchange surface. The warm water conduit comprises a vertical structural member of the submerged portion. The first, second, third and fourth heat exchange surfaces are in cooperation with first, second, third and fourth stage portions of a working fluid conduit, wherein a working fluid flowing through the working fluid conduit is heated to a vapor at each of the first, second, third, and fourth stage portions.

In one aspect the four stage condenser portion comprises a cold water conduit including, a first stage heat exchange surface, a second stage heat exchange surface, a third stage heat exchange surface, and fourth stage heat exchange surface. The cold water conduit comprises a vertical structural member of the submerged portion. The first, second, third and fourth heat exchange surfaces are in cooperation with first, second, third and fourth stage portions of a working fluid conduit, wherein a working fluid flowing through the working fluid conduit is heated to a vapor at each of the first, second, third, and fourth stage portions, with lower a lower ΔT at each successive stage.

In yet another aspect, first, second, third and fourth stage working fluid conduits of the evaporator portion are in communication with a first, second, third and fourth vapor turbine, wherein the evaporator portion first stage working fluid conduit is in communication with a first vapor turbine and exhausts to the fourth stage working fluid conduit of the condenser portion.

In yet another aspect, first, second, third and fourth stage working fluid conduits of the evaporator portion are in communication with a first, second, third and fourth vapor turbine, wherein the evaporator portion second stage working fluid conduit is in communication with a second vapor turbine and exhausts to the third stage working fluid conduit of the condenser portion.

In yet another aspect, first, second, third and fourth stage working fluid conduits of the evaporator portion are in communication with a first, second, third and fourth vapor turbine, wherein the evaporator portion third stage working fluid conduit is in communication with a third vapor turbine and exhausts to the second stage working fluid conduit of the condenser portion.

In yet another aspect, first, second, third and fourth stage working fluid conduits of the evaporator portion are in communication with a first, second, third and fourth vapor turbine, wherein the evaporator portion fourth stage working fluid conduit is in communication with a fourth vapor turbine and exhausts to the first stage working fluid conduit of the condenser portion.

In still a further aspect, a first electrical generator is driven by the first turbine, the fourth turbine, or a combination of the first and fourth turbine.

In still a further aspect, a second electrical generator is driven by the second turbine, the third turbine, or a combination of both the second and third turbine.

Additional aspects of the invention can incorporate one or more of the following features: the first and fourth turbines or the second and third turbines produce between 9 MW and 60 MW of electrical power; the first and second turbines produce approximately 55 MW of electrical power; the first and second turbines form one of a plurality of turbine-generator sets in an Ocean Thermal Energy Conversion power plant; the first stage warm water intake is free of interference from the second stage cold water discharge; the first stage cold water intake is free of interference from the second stage warm water discharge; the working fluid within the first or second stage working fluid passages comprises a commercial refrigerant. The working fluid comprises ammonia, propylene, butane, R-134, or R-22; the working fluid in the first and second stage working fluid passages increases in temperature between 12° F. and 24° F.; a first working fluid flows through the first stage working fluid passage and a second working fluid flows through the second stage working fluid passage, wherein the second working fluid enters the second vapor turbine at a lower temperature than the first working fluid enters the first vapor turbine; the working fluid in the first and second stage working fluid passages decreases in temperature between 12° F. and 24° F.; a first working fluid flows through the first stage working fluid passage and a second working fluid flows through the second stage working fluid passage, wherein the second working fluid enters the second deck portion at a lower temperature than the first working fluid enters the second deck portion.

Further aspects of the invention can also incorporate one or more of the following features: the warm water flowing within the first or second stage warm water structural passage comprises, warm sea water, geo-thermally heated water, solar heated reservoir water; heated industrial cooling water, or a combination thereof; the warm water flows between 500,000 and 6,000,000 gpm; the warm water flows at 5,440,000 gpm; the warm water flows between 300,000,000 lb/hr and 1,000,000,000 lb/hr; the warm water flows at 2,720,000 lb/hr; the cold water flowing within the first or second stage cold water structural passage comprises cold sea water, cold fresh water, cold subterranean water or a combination thereof; the cold water flows between 250,000 and 3,000,000 gpm; the cold water flows at 3,420,000 gpm; the cold water flows between 125,000,000 lb/hr and 1,750,000,000 lb/hr; the cold water flows at 1,710,000 lb/hr.

Aspects of the invention can also incorporate one or more of the following features: the offshore structure is a minimal heave structure; the offshore structure is a floating spar structure; the offshore structure is a semi-submersible structure.

A still further aspect of the invention can include a high-volume, low-velocity heat exchange system for use in an ocean thermal energy conversion power plant, comprising: a first stage cabinet that further comprises a first water flow passage for heat exchange with a working fluid; and a first working fluid passage; and a second stage cabinet coupled to the first stage cabinet, that further comprises a second water flow passage for heat exchange with a working fluid and coupled to the first water flow passage in a manner to minimize pressure drop of water flowing from the first water flow passage to the second water flow passage; and a second working fluid passage. The first and second stage cabinets comprise structural members of the power plant.

In one aspect, water flows from the first stage cabinet to the second stage cabinet and the second stage cabinet is beneath the first stage cabinet evaporator. In another aspect, water flows from the first stage cabinet to the second stage cabinet and the second stage cabinet is above the first stage cabinet in the condensers and below the first stage cabinet in the evaporators.

In still a further aspect, a cold water pipe provides cold water from ocean depths to the cold water intake of the OTEC. The cold water intake can be in the second deck portion of the submerged portion of the OTEC plant. The cold water pipe can be a segmented construction. The cold water pipe can be a continuous pipe. The cold water pipe can comprise: an elongate tubular structure having an outer surface, a top end and a bottom end. The tubular structure can further comprise a plurality of first and second stave segments wherein each stave segment has a top portion and a bottom portion, and wherein the top portion of the second stave segment is offset from the top portion of the first staved segment. The cold water pipe can include a strake or ribbon at least partially wound spirally about the outer surface. The first and second staves and/or the strake can comprise polyvinyl chloride (PVC), chlorinated polyvinyl chloride (CPVC), fiber reinforced plastic (FRP), reinforced polymer mortar (RPMP), polypropylene (PP), polyethylene (PE), cross-linked high-density polyethylene (PEX), polybutylene (PB), acrylonitrile butadiene styrene (ABS); polyester, fiber reinforced polyester, nylon reinforced polyester, vinyl ester, fiber reinforced vinyl ester, nylon reinforced vinyl ester, concrete, ceramic, or a composite of one or more thereof.

Further aspects of the invention include a dynamic connection between the submerged portion of the OTEC plant and the cold water pipe. The dynamic connection can support the weight and dynamic forces of the cold water pipe while it is suspended from the OTEC platform. The dynamic pipe connection can allow for relative movement between the OTEC platform and the cold water pipe. The relative movement can be between 0.5° and 30° from vertical. In one aspect the relative movement can be between 0.5° and 5° from vertical. The dynamic pipe connection can include a spherical or arcuate bearing surface.

In an aspect, a submerged vertical pipe connection comprises a floating structure having a vertical pipe receiving bay, wherein the receiving bay has a first diameter, a vertical pipe for insertion into the pipe receiving bay, the vertical pipe having a second diameter smaller than the first diameter of the pipe receiving bay; a bearing surface; and one or more detents operable with the bearing surface, wherein the detents define a diameter that is different than the first or second diameter when in contact with the bearing surface.

Aspects of the invention may have one or more of the following advantages: OTEC power production requires little to no fuel costs for energy production; the low pressures and low temperatures involved in the OTEC heat engine reduce component costs and require ordinary materials compared to the high-cost, exotic materials used in high pressure, high temperature power generation plants; plant reliability is comparable to commercial refrigeration systems, operating continuously for several years without significant maintenance; reduced construction times compared to high pressure, high temperature plants; and safe, environmentally benign operation and power production. Additional advantages may include, increased net efficiency compared to traditional OTEC systems, lower sacrificial electrical loads; reduced pressure loss in warm and cold water passages; modular components; less frequent off-grid production time; minimal heave and reduced susceptibility to wave action and unseating of the cold water pipe connection; discharge of cooling water below surface levels, intake of warm water free from interference from cold water discharge.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

This invention relates to electrical power generation using Ocean Thermal Energy Conversion (OTEC) technology. Aspects of the invention relate to a floating OTEC power plant having improved overall efficiencies with reduced parasitic loads, greater stability, lower construction and operating costs over prior OTEC power plants. Other aspects include large volume water conduits that are integral with the floating structure. Modularity and compartmentation of the multi-stage OTEC heat engine reduces construction and maintenance costs, limits off-grid operation and improves operating performance and survivability. Still further aspects provide for a floating platform having integrated heat exchange compartments and provides for minimal movement of the platform due to wave action. The integrated floating platform may also provide for efficient flow of the warm water or cool water through the multi-stage heat exchanger, increasing efficiency and reducing the parasitic power demand. Aspects of the invention promote a neutral thermal footprint by discharging warm and cold water at appropriate depth/temperature ranges. Energy extracted in the form of electricity reduces the bulk temperature to the ocean.

OTEC is a process that uses heat energy from the sun that is stored in the Earth's oceans to generate electricity. OTEC utilizes the temperature difference between the warmer, top layer of the ocean and the colder, deep ocean water. Typically this difference is at least 36° F. (20° C.). These conditions exist in tropical areas, roughly between the Tropic of Capricorn and the Tropic of Cancer, or even 20° north and south latitude. The OTEC process uses the temperature difference to power a Rankine cycle, with the warm surface water serving as the heat source and the cold deep water serving as the heat sink. Rankine cycle turbines drive generators which produce electrical power.

Figure 1:
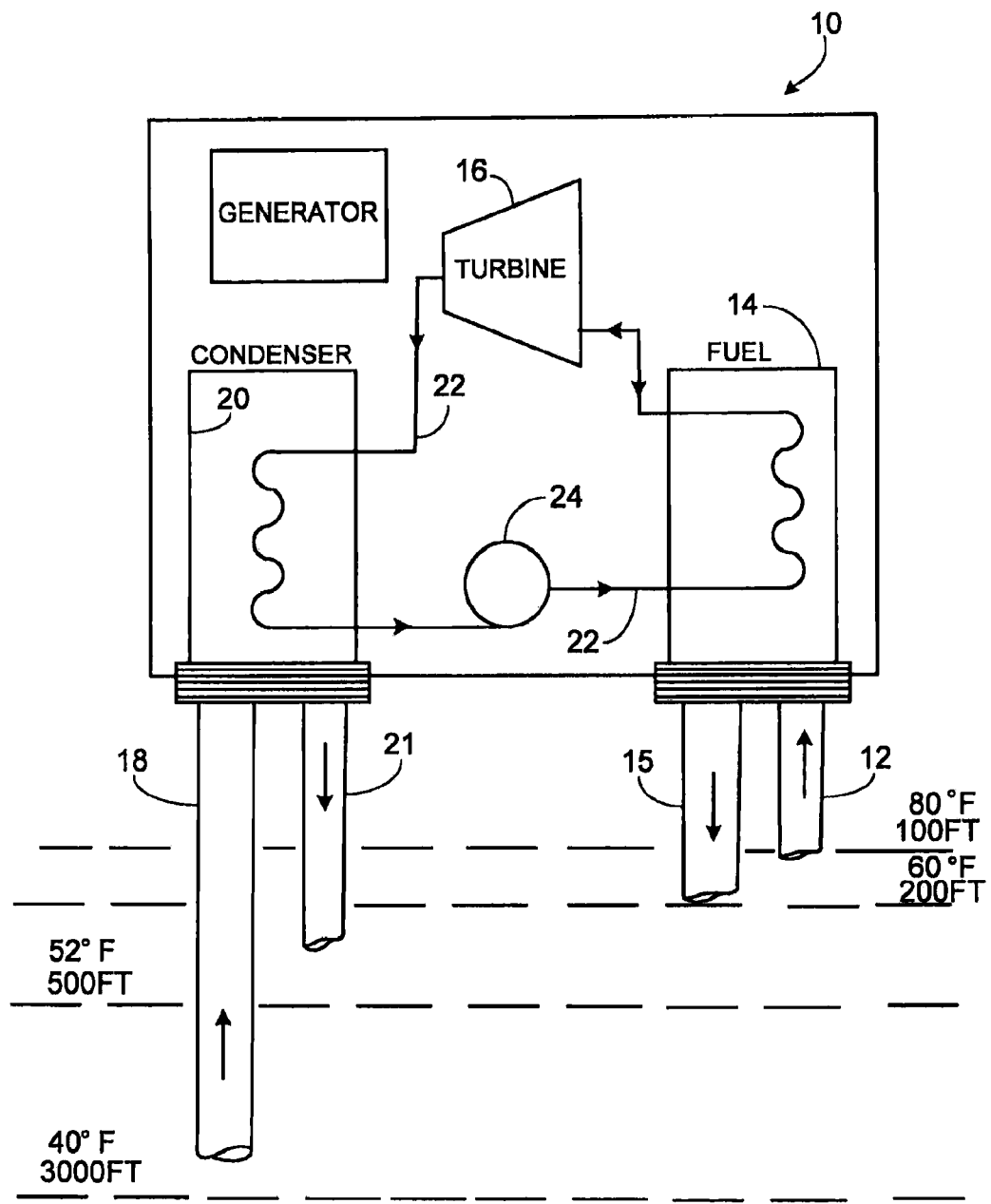
FIG. 1 illustrates an exemplary prior-art OTEC heat engine.

FIG. 1 illustrates a typical OTEC Rankine cycle heat engine 10 which includes warm sea water inlet 12, evaporator 14, warm sea water outlet 15, turbine 16, cold sea water inlet 18, condenser 20, cold sea water outlet 21, working fluid conduit 22 and working fluid pump 24.

In operation, heat engine 10 can use any one of a number of working fluids, for example commercial refrigerants such as ammonia. Other working fluids can include propylene, butane, R-22 and R-134a. Other commercial refrigerants can be used. Warm sea water between approximately 75° F. and 85° F., or more, is drawn from the ocean surface or just below the ocean surface through warm sea water inlet 12 and in turn warms the ammonia working fluid passing through evaporator 14. The ammonia boils to a vapor pressure of approximately 9.3 atm. The vapor is carried along working fluid conduit 22 to turbine 16. The ammonia vapor expands as it passes through the turbine 16, producing power to drive an electric generator 25. The ammonia vapor then enters condenser 20 where it is cooled to a liquid by cold sea water drawn from a deep ocean depth of approximately 3000 ft. The cold sea water enters the condenser at a temperature of approximately 40° F. The vapor pressure of the ammonia working fluid at the temperature in the condenser 20, approximately 51° F., is 6.1 atm. Thus, a significant pressure difference is available to drive the turbine 16 and generate electric power. As the ammonia working fluid condenses, the liquid working fluid is pumped back into the evaporator 14 by working fluid pump 24 via working fluid conduit 22.

The heat engine 10 of FIG. 1 is essentially the same as the Rankine cycle of most steam turbines, except that OTEC differs by using different working fluids and lower temperatures and pressures. The heat engine 10 of the FIG. 1 is also similar to commercial refrigeration plants, except that the OTEC cycle is run in the opposite direction so that a heat source (e.g., warm ocean water) and a cold heat sink (e.g., deep ocean water) are used to produce electric power.

Figure 2:
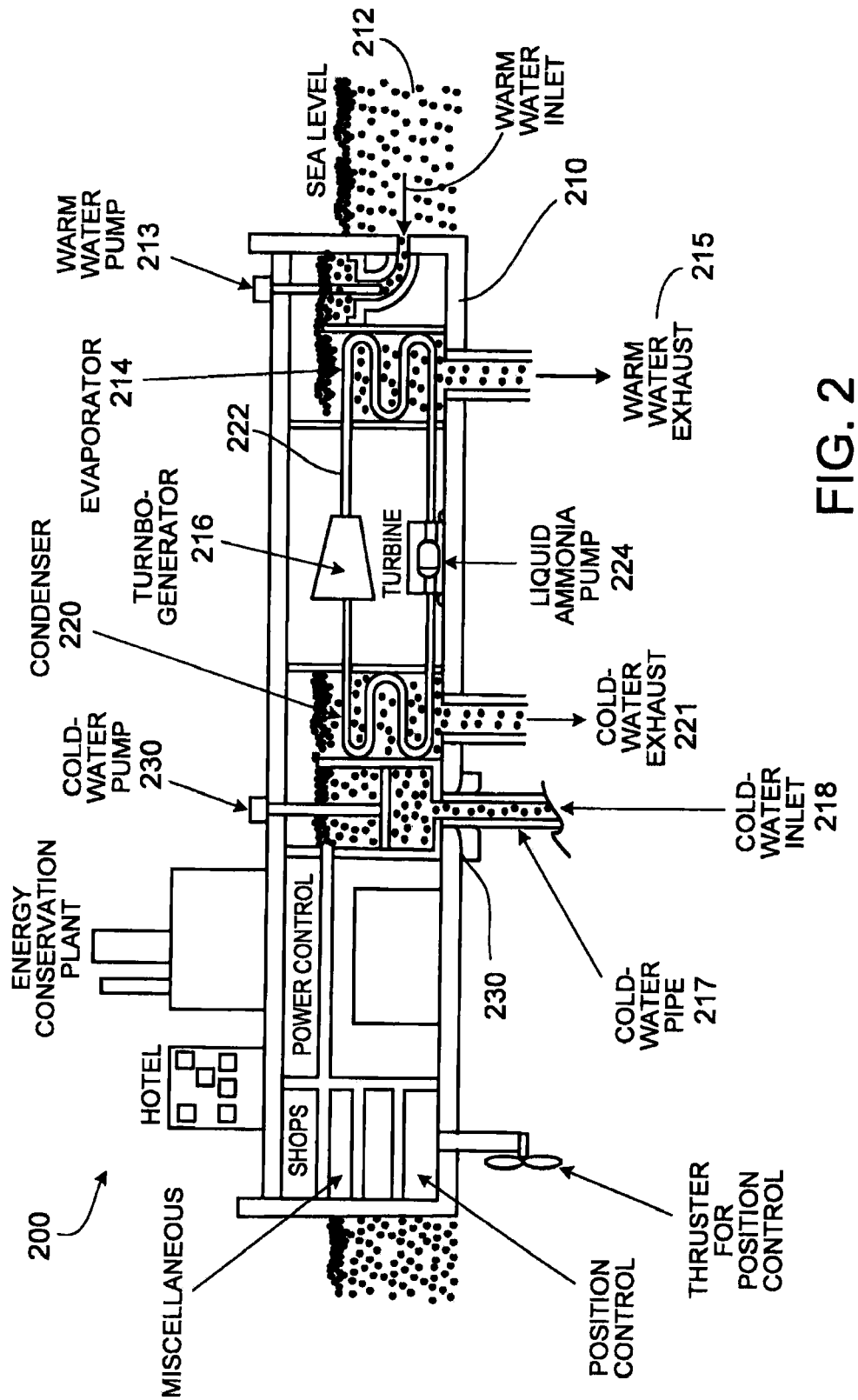
FIG. 2 illustrates an exemplary prior-art OTEC power plant.

FIG. 2 illustrates the typical components of a floating OTEC power plant 200, which include: the vessel or platform 210, warm sea water inlet 212, warm water pump 213, evaporator 214, warm sea water outlet 215, turbine-generator 216, cold water pipe 217, cold water inlet 218, cold water pump 219, condenser 220, cold water outlet 221, working fluid conduit 222, working fluid pump 224, and pipe connections 230. OTEC plant 200 can also include electrical generation, transformation and transmission systems, position control systems such as propulsion, thrusters, or mooring systems, as well as various auxiliary and support systems (for example, personnel accommodations, emergency power, portable water, black and grey water, fire fighting, damage control, reserve buoyancy, and other common shipboard or marine systems.).

Implementations of OTEC power plants utilizing the basic heat engine and system of FIGS. 1 and 2 have a relatively low overall efficiency of 3% or below. Because of this low thermal efficiency, OTEC operations require the flow of large amounts of water through the power system per kilowatt of power generated. This in turn requires large heat exchangers having large heat exchange surface areas.

Such large volumes of water and large surface areas require considerable pumping capacity in the warm water pump 213 and cold water pump 219, reducing the net electrical power available for distribution to a shore-based facility or on board industrial purposes. Moreover, the limited space of most surface vessels, does not easily facilitate large volumes of water directed to and flowing through the evaporator or condenser. Indeed, large volumes of water require large diameter pipes and conduits. Putting such structures in limited space requires multiple bends to accommodate other machinery. And the limited space of typical surface vessels or structures does not easily facilitate the large heat exchange surface area required for maximum efficiency in an OTEC plant. Thus the OTEC systems and vessel or platform have traditional been large and costly. This has lead to an industry conclusion that OTEC operations are a high cost, low yield energy production option when compared to other energy production options using higher temperatures and pressures.

Aspects of the invention address technical challenges in order to improve the efficiency of OTEC operations and reduce the cost of construction and operation.

The vessel or platform 210 requires low motions to minimize dynamic forces between the cold water pipe 217 and the vessel or platform 210 and to provide a benign operating environment for the OTEC equipment in the platform or vessel. The vessel or platform 210 should also support cold and warm water inlet (218 and 212) volume flows, bringing in sufficient cold and warm water at appropriate levels to ensure OTEC process efficiency. The vessel or platform 210 should also enable cold and warm water discharge via cold and warm water outlets (221 and 215) well below the waterline of vessel or platform 210 to avoid thermal recirculation into the ocean surface layer. Additionally, the vessel or platform 210 should survive heavy weather without disrupting power generating operations.

The OTEC heat engine 10 should utilize a highly efficient thermal cycle for maximum efficiency and power production. Heat transfer in boiling and condensing processes, as well as the heat exchanger materials and design, limit the amount of energy that can be extracted from each pound of warm seawater. The heat exchangers used in the evaporator 214 and the condenser 220 require high volumes of warm and cold water flow with low head loss to minimize parasitic loads. The heat exchangers also require high coefficients of heat transfer to enhance efficiency The heat exchangers can incorporate material and design that may be tailored to the warm and cold water inlet temperatures to enhance efficiency. The heat exchanger design should use a simple construction method with minimal amounts of material to reduce cost and volume.

Figure 3:
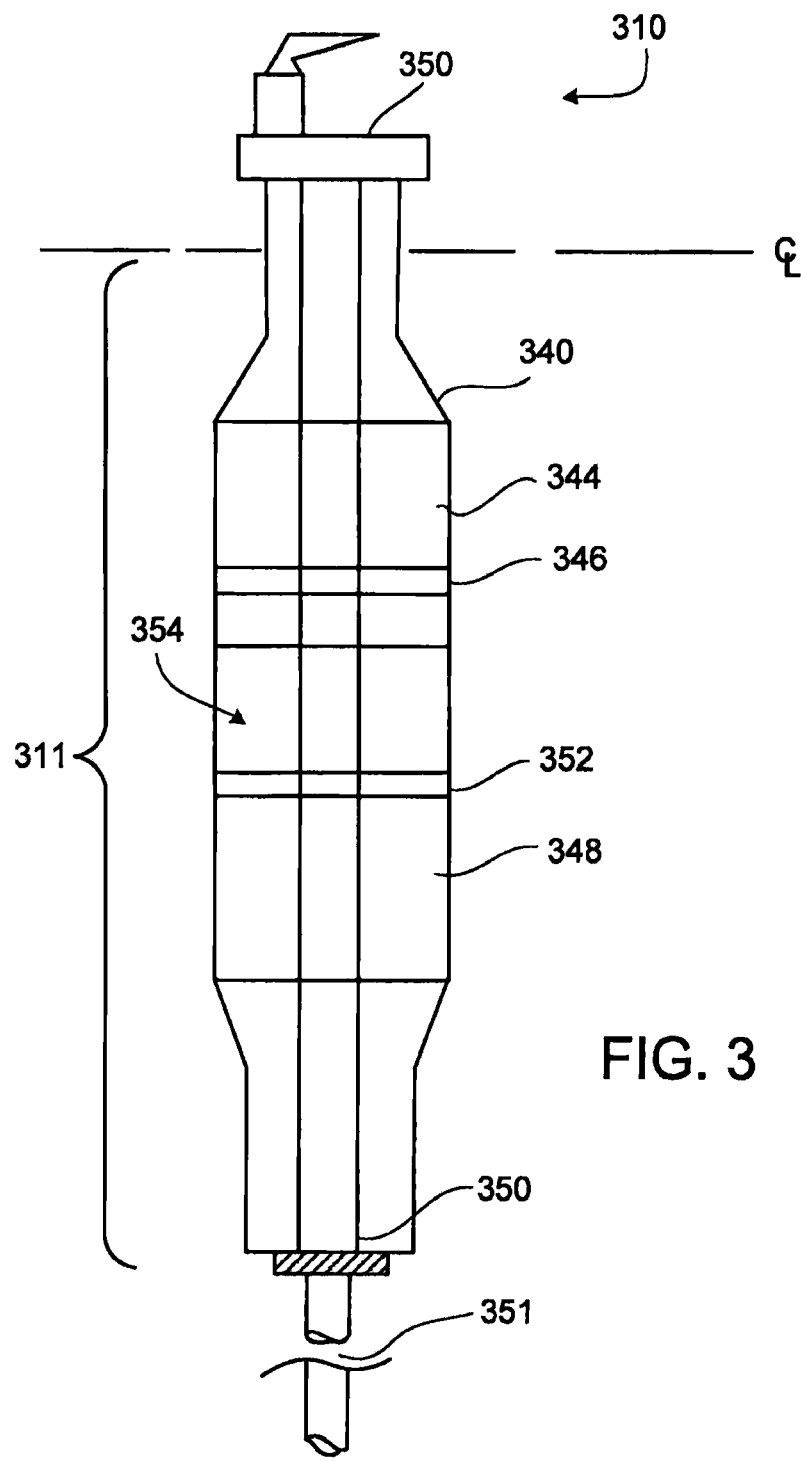
FIG. 3 illustrates OTEC structure of the present invention.

Turbine generators 216 should be highly efficient with minimal internal losses and may also be tailored to the working fluid to enhance efficiency FIG. 3 illustrates an implementation of the present invention that enhances the efficiency of previous OTEC power plants and overcomes many of the technical challenges associated therewith. This implementation comprises a spar for the vessel or platform, with heat exchangers and associated warm and cold water piping integral to the spar.

OTEC Spar 310 houses an integral multi-stage heat exchange system for use with an OTEC power generation plant. Spar 310 includes a submerged portion 311 below waterline 305. Submerged portion 311 comprises warm water intake portion 340, evaporator portion 344, warm water discharge portion 346, condenser portion 348, cold water intake portion 350, cold water pipe 351, cold water discharge portion 352, machinery deck portion 354, and deck house 360.

In operation, warm sea water of between 75° F. and 85° F. is drawn through warm water intake portion 340 and flows down the spar though structurally integral warm water conduits not shown. Due to the high volume water flow requirements of OTEC heat engines, the warm water conduits direct flow to the evaporator portion 344 of between 500,000 gpm and 6,000,000 gpm. Such warm water conduits have a diameter of between 6 ft and 35 ft, or more. Due to this size, the warm water conduits are vertical structural members of spar 310. Warm water conduits can be large diameter pipes of sufficient strength to vertically support spar 310. Alternatively, the warm water conduits can be passages integral to the construction of the spar 310.

Warm water then flows through the evaporator portion 344 which houses one or more stacked, multi-stage heat exchangers for warming a working fluid to a vapor. The warm sea water is then discharged from spar 310 via warm water discharge 346. Warm water discharge can be located or directed via a warm water discharge pipe to a depth at or close to an ocean thermal layer that is approximately the same temperature as the warm water discharge temperature to minimize environmental impacts. The warm water discharge can be directed to a sufficient depth to ensure no thermal recirculation with either the warm water intake or cold water intake.

Cold sea water is drawn from a depth of between 2500 and 4200 ft, or more, at a temperature of approximately 40° F., via cold water pipe 351. The cold sea water enters spar 310 via cold water intake portion 350. Due to the high volume water flow requirements of OTEC heat engines, the cold sea water conduits direct flow to the condenser portion 348 of between 500,000 gpm and 3,500,000 gpm. Such cold sea water conduits have a diameter of between 6 ft and 35 ft, or more. Due to this size, the cold sea water conduits are vertical structural members of spar 310. Cold water conduits can be large diameter pipes of sufficient strength to vertically support spar 310. Alternatively, the cold water conduits can be passages integral to the construction of the spar 310.

Cold sea water then flows upward to stacked multi-stage condenser portion 348, where the cold sea water cools a working fluid to a liquid. The cold sea water is then discharged from spar 310 via cold sea water discharge 352. Cold water discharge can be located or directed via a cold sea water discharge pipe to depth at or close to an ocean thermal layer that is approximately the same temperature as the cold sea water discharge temperature. The cold water discharge can be directed to a sufficient depth to ensure no thermal recirculation with either the warm water intake or cold water intake.

Machinery deck portion 354 can be positioned vertically between the evaporator portion 344 and the condenser portion 348. Positioning machinery deck portion 354 beneath evaporator portion 344 allows nearly straight line warm water flow from intake, through the multi-stage evaporators, and to discharge. Positioning machinery deck portion 354 above condenser portion 348 allows nearly straight line cold water flow from intake, through the multi-stage condensers, and to discharge. Machinery deck portion 354 includes turbo-generators 356. In operation warm working fluid heated to a vapor from evaporator portion 344 flows to one or more turbo generators 356. The working fluid expands in turbo generator 356 thereby driving a turbine for the production of electrical power. The working fluid then flows to condenser portion 348 where it is cooled to a liquid and pumped to evaporator portion 344.

Figure 4:
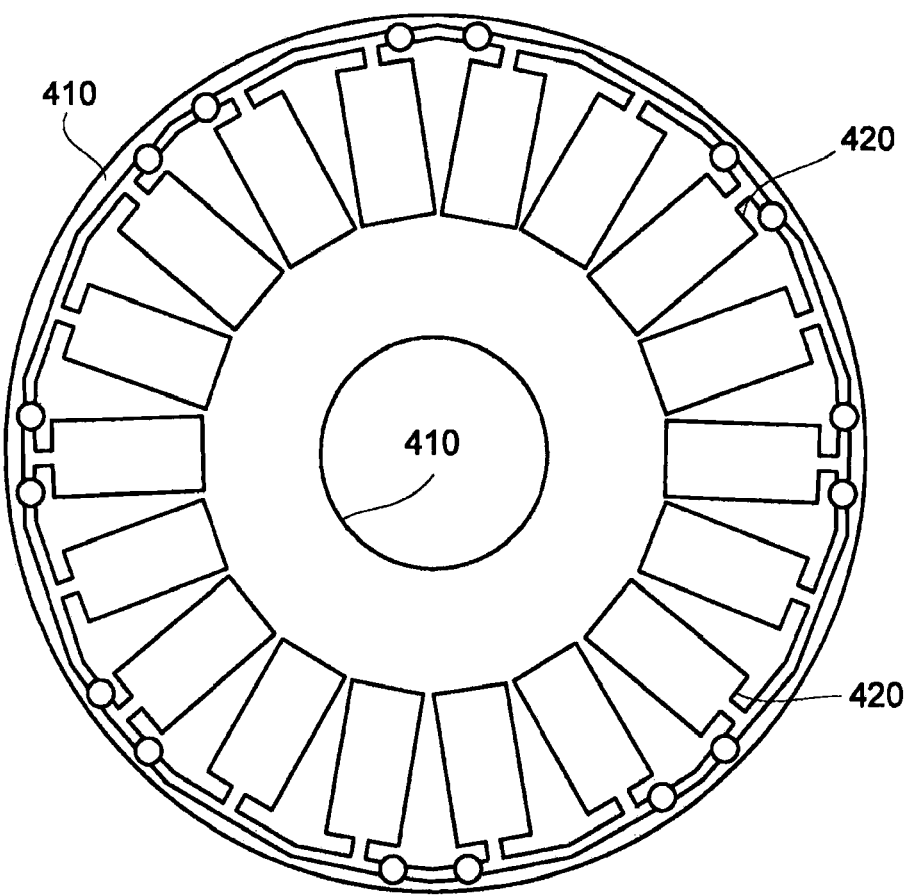
FIG. 4 illustrates a deck plan of a heat exchanger deck of the present invention.

FIG. 4 illustrates an implementation of the present invention wherein a plurality of multi-stage heat exchangers 420 are arranged about the periphery of OTEC spar 410. Heat exchangers 420 can be evaporators or condensers used in an OTEC heat engine. The peripheral layout of heat exchanges can be utilized with evaporator portion 344 or condenser portion 348 of an OTEC spar platform. The peripheral arrangement can support any number of heat exchangers (e.g., 1 heat exchanger, between 2 and 8 heat exchangers, 8-16 heat exchanger, 16-32 heat exchangers, or 32 or more heat exchangers). One or more heat exchangers can be peripherally arranged on a single deck or on multiple decks (e.g., on 2, 3, 4, 5, or 6 or more decks) of the OTEC spar 410. One or more heat exchangers can be peripherally offset between two or more decks such that no two heat exchangers are vertically aligned over one another. One or more heat exchangers can be peripherally arranged so that heat exchangers in one deck are vertically aligned with heat exchanges on another adjacent deck.

Individual heat exchangers 420 can comprise a multi-stage heat exchange system (e.g., a 2, 3, 4, 5, or 6 or more heat exchange system). In an embodiment, individual heat exchangers 420 can be a cabinet heat exchanger constructed to provide minimal pressure loss in the warm sea water flow, cold sea water flow, and working fluid flow through the heat exchanger.

Figure 5:
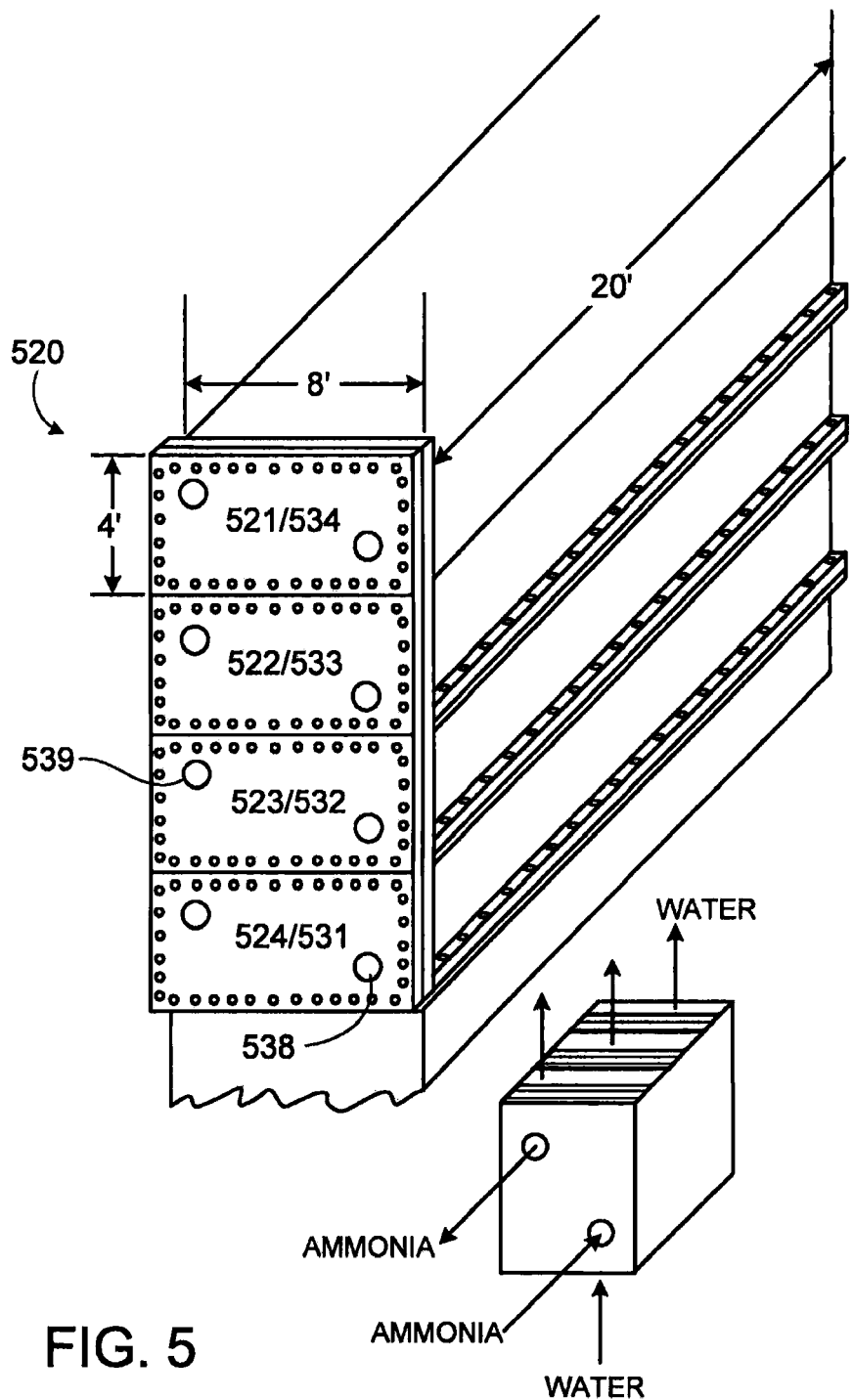
FIG. 5 illustrates a cabinet heat exchanger of the present invention.

Referring to FIG. 5 an embodiment of a cabinet heat exchanger 520 includes multiple heat exchange stages, 521, 522, 523 and 524. In an implementation the stacked heat exchangers accommodate warm sea water flowing down through the cabinet, from first evaporator stage 521, to second evaporator stage 522, to third evaporator stage 523 to fourth evaporator stage 524. In another embodiment of the stacked heat exchange cabinet, cold sea water flows up through the cabinet from first condenser stage 531, to second condenser stage 532, to third condenser stage 533, to fourth condenser stage 534. Working fluid flows through working fluid supply conduits 538 and working fluid discharge conduits 539. In an embodiment, working fluid conduits 538 and 539 enter and exit each heat exchanger stage horizontally as compared to the vertical flow of the warm sea water or cold sea water. The vertical multi-stage heat exchange design of cabinet heat exchanger 520 facilitates an integrated vessel (e.g., spar) and heat exchanger design, removes the requirement for interconnecting piping between heat exchanger stages, and ensures that virtually all of the heat exchanger system pressure drop occurs over the heat transfer surface.

In an aspect, the heat transfer surface can be optimized using surface shape, treatment and spacing. Material selection such as alloys of aluminum offer superior economic performance over traditional titanium base designs. The heat transfer surface can comprise 3000 Series or 5000 Series Aluminum alloys. The heat transfer surface can comprise titanium and titanium alloys.

It has been found that the multi-stage heat exchanger cabinet enables the maximum energy transfer to the working fluid from the sea water within the relatively low available temperature differential of the OTEC heat engine. The thermodynamic efficiency of any OTEC power plant is a function of how close the temperature of the working fluid approaches that of the sea water. The physics of the heat transfer dictate that the area required to transfer the energy increases as the temperature of the working fluid approaches that of the sea water. To offset the increase in surface area, increasing the velocity of the sea water can increase the heat transfer coefficient. But this greatly increases the power required for pumping, thereby increasing the parasitic electrical load on the OTEC plant.

Figure 6A:
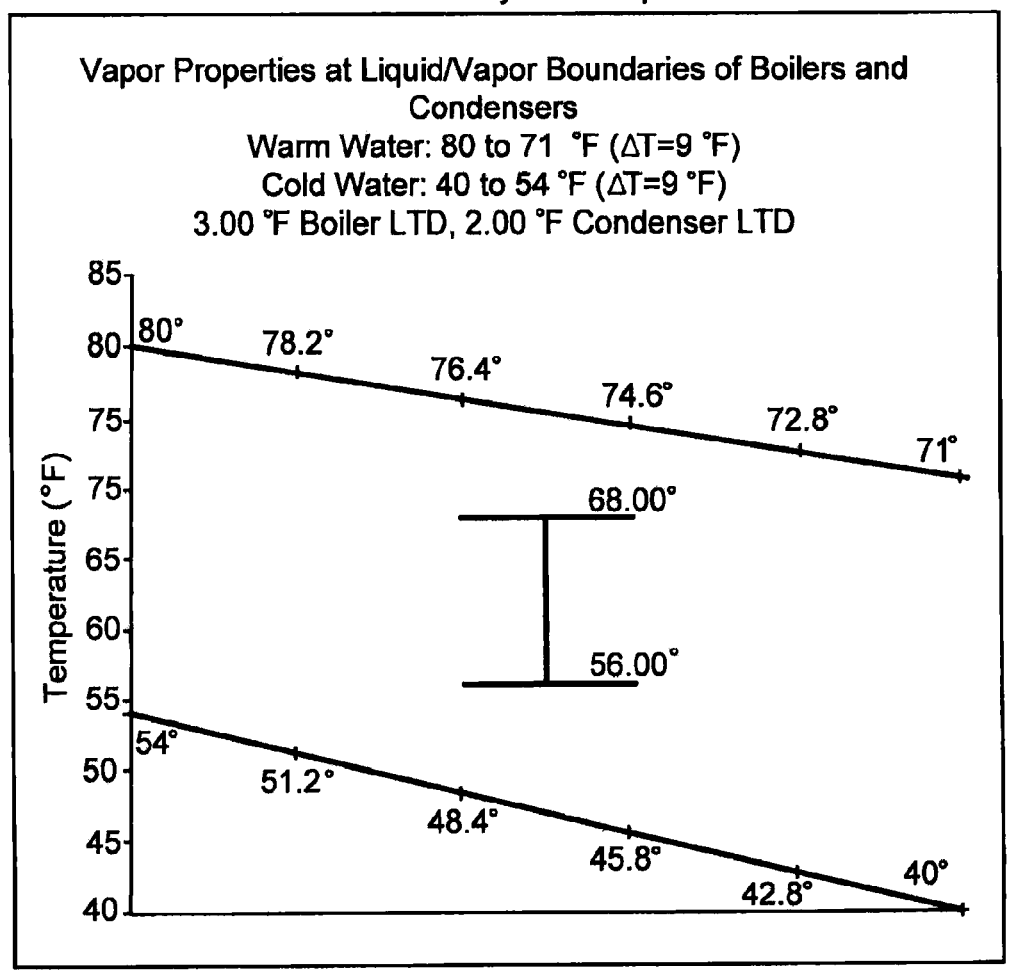
FIG. 6A illustrates a conventional heat exchange cycle.

Referring to FIG. 6A, a conventional OTEC cycle wherein the working fluid is boiled in a heat exchanger using warm surface sea water. The fluid properties in this conventional Rankine cycle are constrained by the boiling process that limits the leaving working fluid to approximately 3° F. below the leaving warm seawater temperature. In a similar fashion, the condensing side of the cycle is limited to being no close than 2° F. higher than the leaving cold seawater temperature. The total available temperature drop for the working fluid is approximately 12° F. (between 68° F. and 56° F.).

It has been found that a cascading multi-stage OTEC cycle allows the working fluid temperatures to more closely match that of the sea water. This increase in temperature differential increases the amount of work that can be done by the turbines associated with the OTEC heat engine.

Figure 6B:
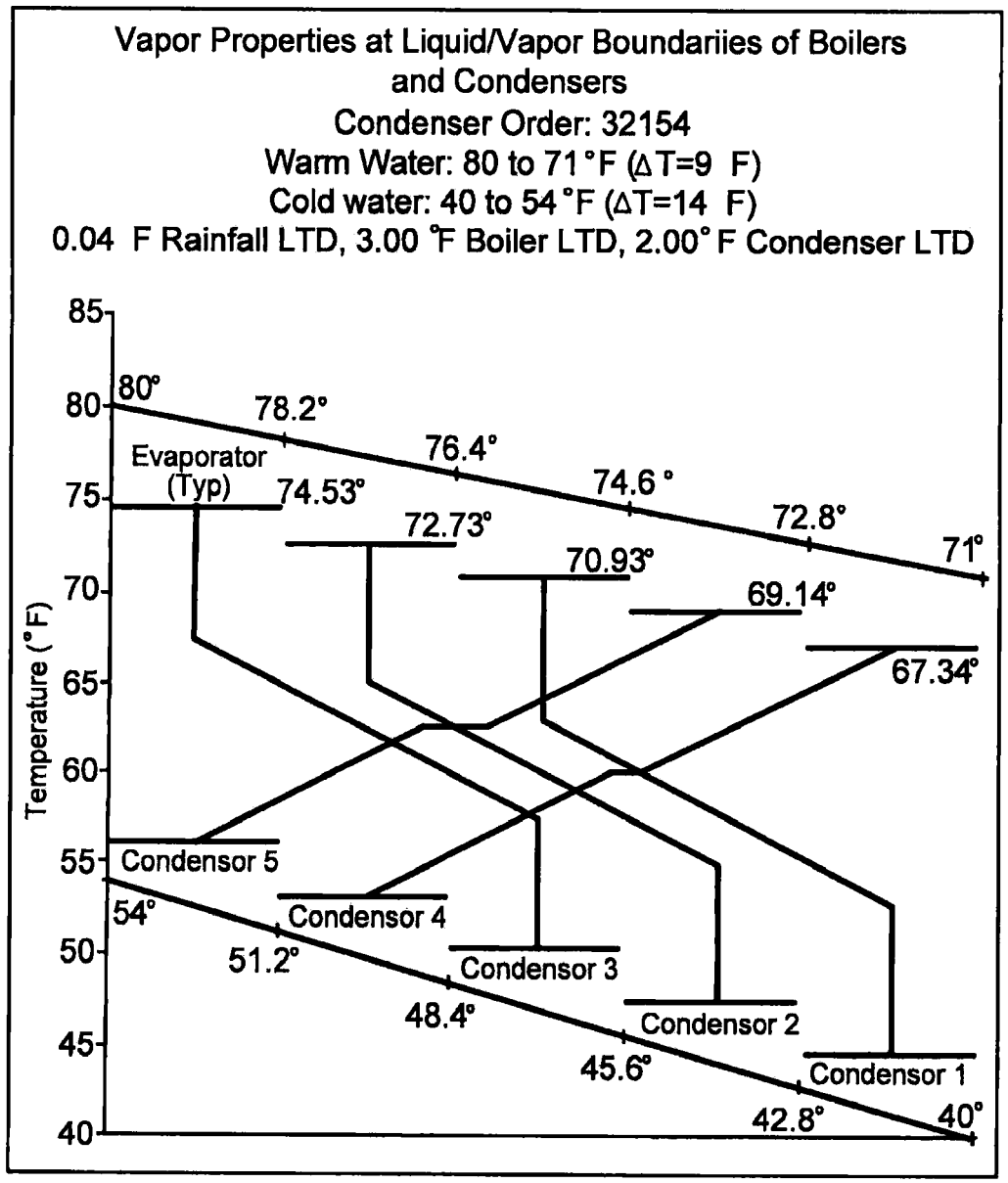
FIG. 6B illustrates a cascading multi-stage heat exchange cycle.

Referring to FIG. 6B, an aspect of a cascading multi-stage OTEC cycle using multiple steps of boiling and condensing to expand the available working fluid temperature drop. Each step requires an independent heat exchanger, or a dedicated heat exchanger stage in the cabinet heat exchanger 520 of FIG. 5. The cascading multi-stage OTEC cycle of FIG. 6b allows for matching the output of the turbines with the expected pumping loads for the sea water and working fluid. This highly optimized design would require dedicated and customized turbines.

Figure 6C:
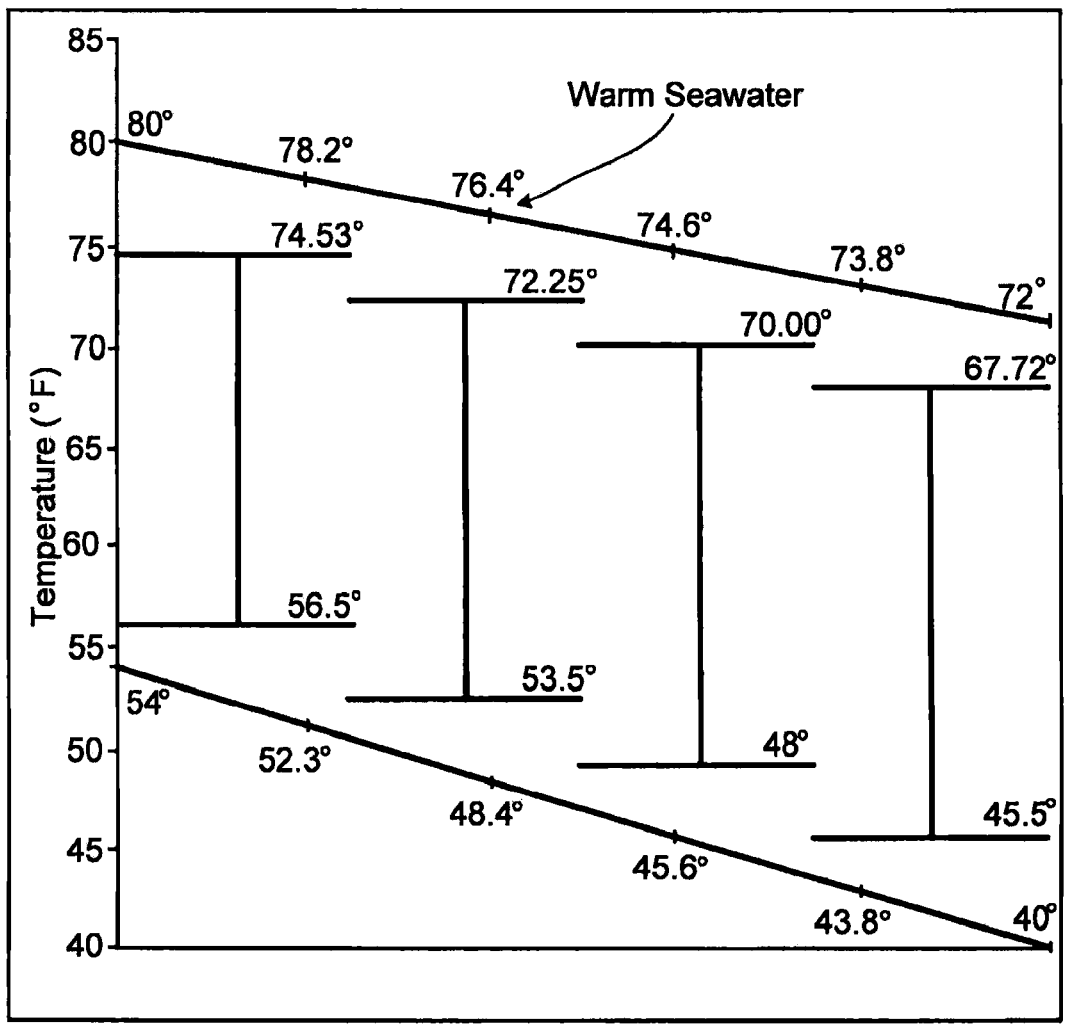
FIG. 6C illustrates a hybrid cascading multi-stage heat exchange cycle.

Referring to FIG. 6C, a hybrid yet still optimized cascading OTEC cycle is shown that facilitates the use of identical equipment (e.g., turbines, generators, pumps) while retaining the thermodynamic efficiencies or optimization of the true cascade arrangement of FIG. 6B. In the hybrid cascade cycle of FIG. 6C, the available temperature differential for the working fluid ranges from about 18° F. to about 22° F. This narrow range allows the turbines in the heat engine to have identical performance specifications, thereby lowering construction and operation costs.

System performance and power output is greatly increased using the hybrid cascade cycle in an OTEC power plant. Table A compares the performance of the conventional cycle of FIG. 6A with that of the hybrid cascading cycle of FIG. 6C.

TABLE A

Estimated Performance for 100 MW Net Output

|  | Conventional Cycle | Four Stage Hybrid Cascade Cycle |
|---|---|---|
| Warm Sea Water Flow | 4,800,000 GPM | 3,800,000 GPM |
| Cold Sea Water Flow | 3,520,000 GPM | 2,280,000 GPM |
| Gross Heat Rate | 163,000 BTU/kWH | 110,500 BTU/kWH |

Utilizing the four stage hybrid cascade heat exchange cycle reduces the amount of energy that needs to be transferred between the fluids. This in turn serves to reduce the amount of heat exchange surface that is required.

The performance of heat exchangers is affected by the available temperature difference between the fluids as well as the heat transfer coefficient at the surfaces of the heat exchanger. The heat transfer coefficient generally varies with the velocity of the fluid across the heat transfer surfaces. Higher fluid velocities require higher pumping power, thereby reducing the net efficiency of the plant. A hybrid cascading multi-stage heat exchange system facilitates lower fluid velocities and greater plant efficiencies. The stacked hybrid cascade heat exchange design also facilitates lower pressure drops through the heat exchanger. And the vertical plant design facilitates lower pressure drop across the whole system.

Figure 6D:
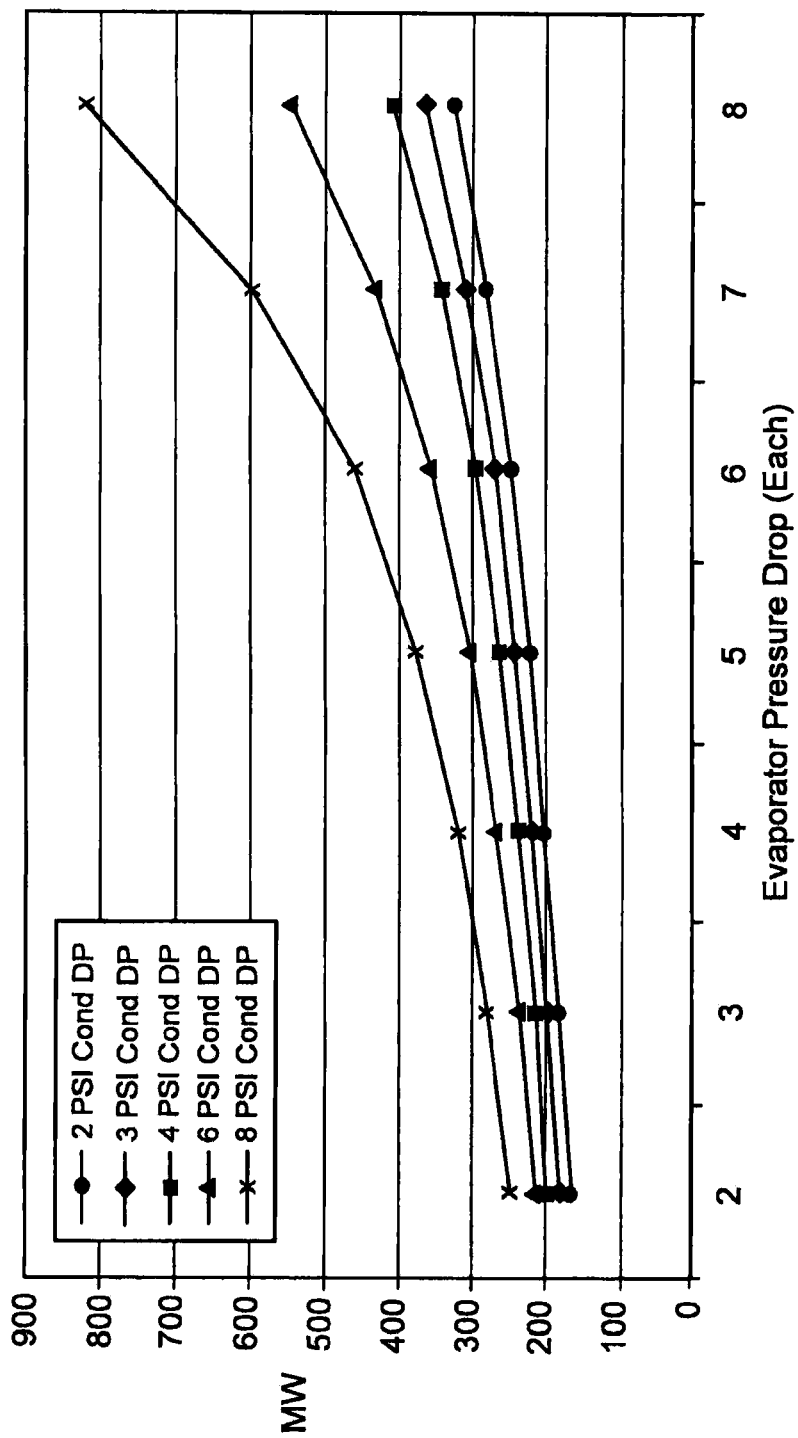
FIG. 6D illustrates the evaporator pressure drop and associate power production.

FIG. 6D illustrates the impact of heat exchanger pressure drop on the total OTEC plant generation to deliver 100 MW to a power grid. Minimizing pressure drop through the heat exchanger greatly enhances the OTEC power plant's performance. Pressure drop is reduced by providing an integrated vessel or platform—heat exchanger system, wherein the sea water conduits form structural members of the vessel and allow for sea water flow from one heat exchanger stage to another in series. An approximate straight line sea water flow, with minimal changes in direction from intake into the vessel, through the pump, through the heat exchange cabinets and in turn through each heat exchange stage in series, and ultimate discharging from the plant, allows for minimal pressure drop.

Example

Aspects of the present invention provide an integrated multi-stage OTEC power plant that will produce electricity using the temperature differential between the surface water and deep ocean water in tropical and subtropical regions. Aspects eliminate traditional piping runs for sea water by using the off-shore vessel's or platform's structure as a conduit or flow passage. Alternatively, the warm and cold sea water piping runs can use conduits or pipes of sufficient size and strength to provide vertical or other structural support to the vessel or platform. These integral sea water conduit sections or passages serve as structural members of the vessel, thereby reducing the requirements for additional steel. As part of the integral sea water passages, multi-stage cabinet heat exchangers provide multiple stages of working fluid evaporation without the need for external water nozzles or piping connections. The integrated multi-stage OTEC power plant allows the warm and cold sea water to flow in their natural directions The warm sea water flows downward through the vessel as it is cooled before being discharged into a cooler zone of the ocean. In a similar fashion, the cold sea water from deep in the ocean flows upward through the vessel as it is warmed before discharging into a warmer zone of the ocean.

This arrangement avoids the need for changes in sea water flow direction and associated pressure losses. The arrangement also reduces the pumping energy required.

Multi-stage cabinet heat exchangers allow for the use of a hybrid cascade OTEC cycle. These stacks of heat exchangers comprise multiple heat exchanger stages or sections that have sea water passing through them in series to boil or condense the working fluid as appropriate. In the evaporator section the warm sea water passes through the first stage where it boils off some of the working fluid as the sea water is cooled. The warm sea water then flows down the stack into the next heat exchanger stage and boils off additional working fluid at a slightly lower pressure and temperature. This occurs sequentially through the entire stack. Each stage or section of the cabinet heat exchanger supplies working fluid vapor to a dedicated turbine that generates electrical power. Each of the evaporator stages has a corresponding condenser stage at the exhaust of the turbine. The cold sea water passes through the condenser stacks in a reverse order to the evaporators.

Figure 7A:
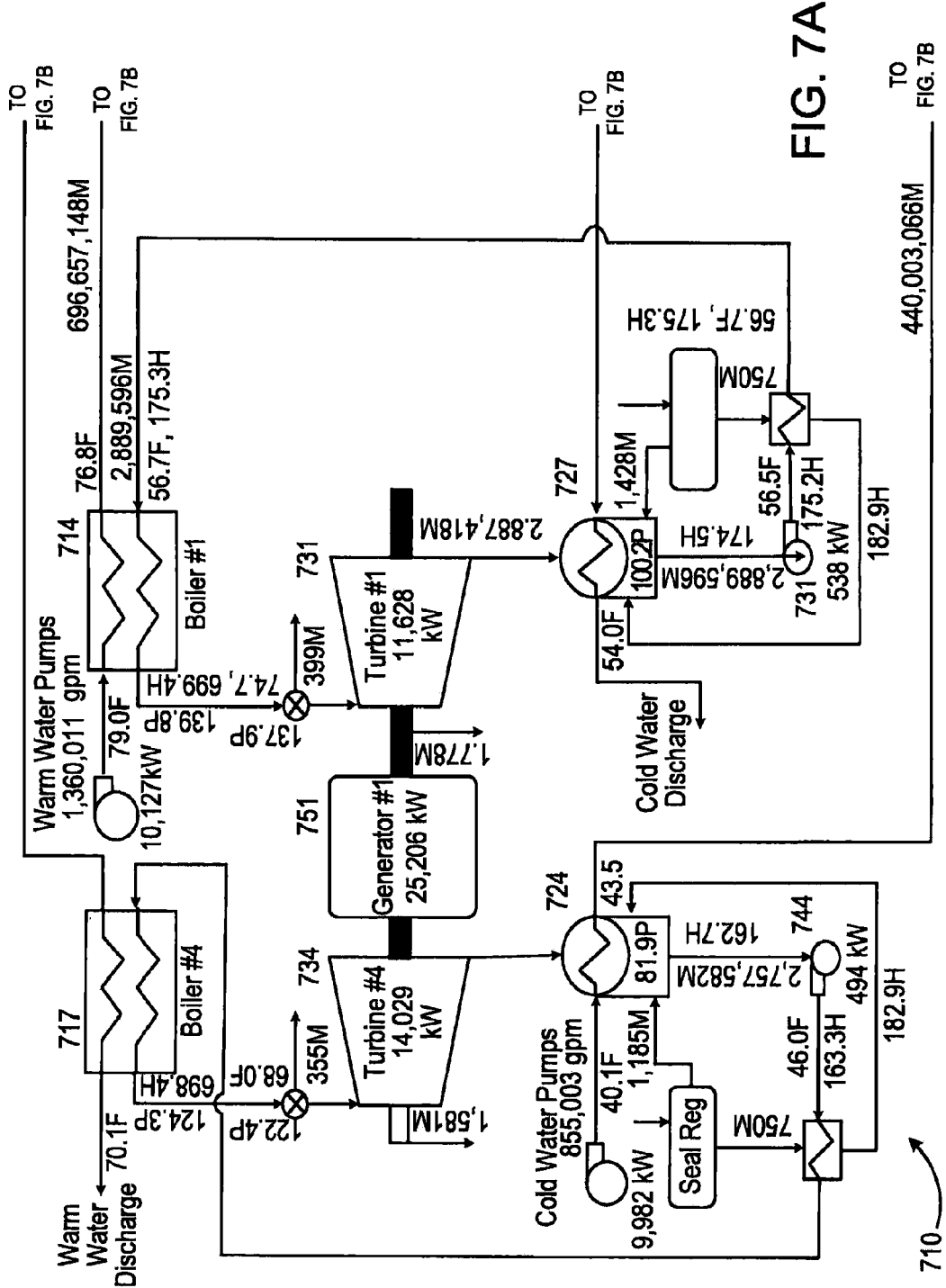
FIGS. 7A and 7B illustrate an exemplary OTEC heat engine.
Figure 7B:
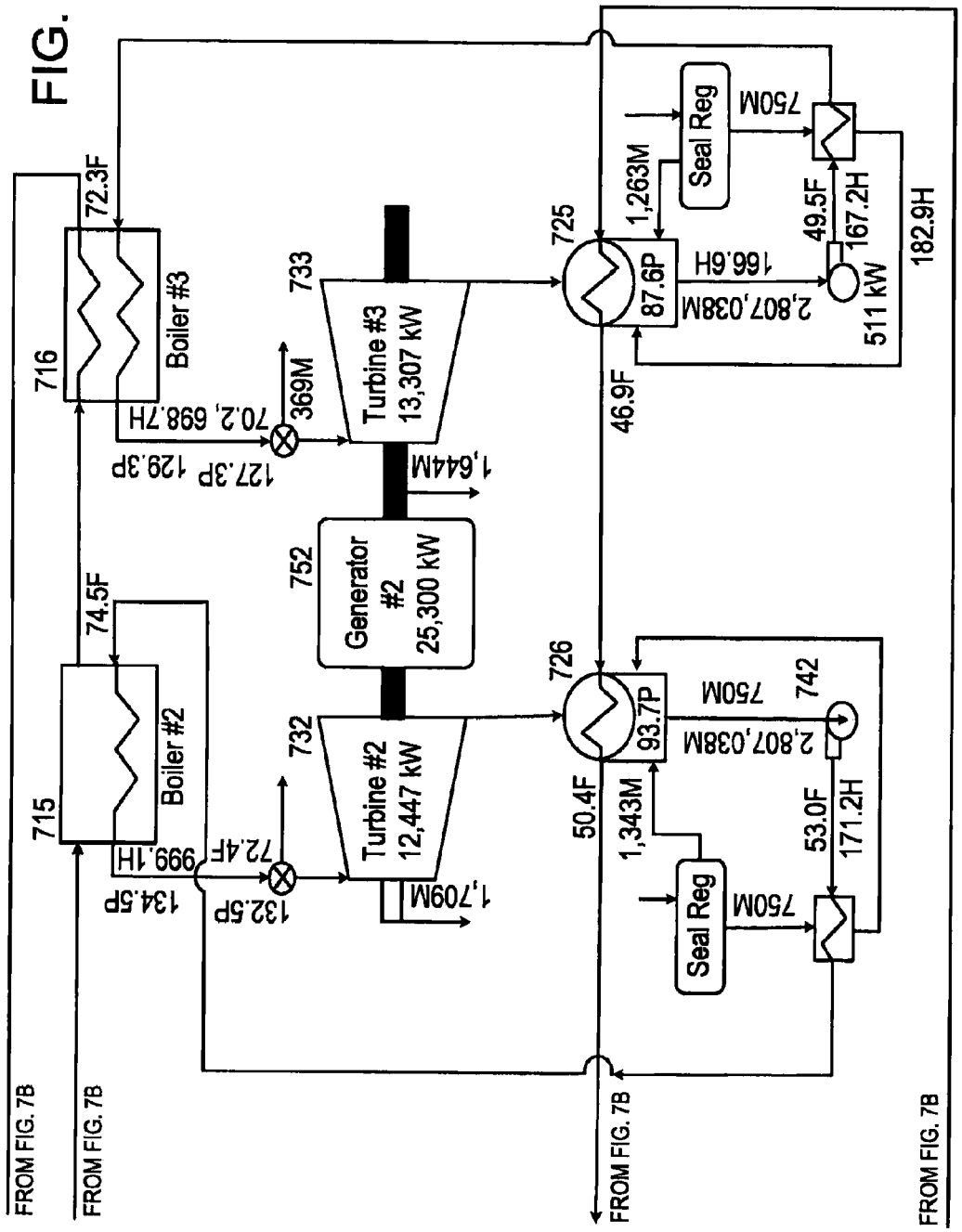

Referring to FIG. 7, an exemplary multi-stage OTEC heat engine 710 utilizing hybrid cascading heat exchange cycles is provided. Warm sea water is pumped from a warm sea water intake (not shown) via warm water pump 712, discharging from the pump at approximately 1,360,000 gpm and at a temperature of approximately 79° F. All or parts of the warm water conduit from the warm water intake to the warm water pump, and from the warm water pump to the stacked heat exchanger cabinet can form integral structural members of the vessel.

From the warm water pump 712, the warm sea water then enters first stage evaporator 714 where it boils a first working fluid. The warm water exits first stage evaporator 714 at a temperature of approximately 76.8° F. and flows down to the second stage evaporator 715.

The warm water enters second stage evaporator 715 at approximately 76.8° F. where it boils a second working fluid and exits the second stage evaporator 715 at a temperature of approximately 74.5°.

The warm water flows down to the third stage evaporator 716 from the second stage evaporator 715, entering at a temperature of approximately 74.5° F., where it boils a third working fluid. The warm water exits the third stage evaporator 716 at a temperature of approximately 72.3° F.

The warm water then flows from the third stage evaporator 716 down to the fourth stage evaporator 717, entering at a temperature of approximately 72.3° F., where it boils a fourth working fluid. The warm water exits the fourth stage evaporator 717 at a temperature of approximately 70.1° F. and then discharges from the vessel. Though not shown, the discharge can be directed to a thermal layer at an ocean depth of or approximately the same temperature as the discharge temperature of the warm sea water. Alternately, the portion of the power plant housing the multi-stage evaporator can be located at a depth within the structure so that the warm water is discharged to an appropriate ocean thermal layer. In aspects, the warm water conduit from the fourth stage evaporator to the warm water discharge of the vessel can be comprise structural members of the vessel.

Similarly, cold sea water is pumped from a cold sea water intake (not shown) via cold sea water pump 722, discharging from the pump at approximately 855,003 gpm and at a temperature of approximately 40.0° F. The cold sea water is drawn from ocean depths of between approximately 2700 and 4200 ft, or more. The cold water conduit carrying cold sea water from the cold water intake of the vessel to the cold water pump, and from the cold water pump to the first stage condenser can comprise in its entirety or in part structural members of the vessel.

From cold sea water pump 722, the cold sea water enters a first stage condenser 724, where it condenses the fourth working fluid from the fourth stage boiler 717. The cold seawater exits the first stage condenser at a temperature of approximately 43.5° F. and flows up to the second stage condenser 725.

The cold sea water enters the second stage condenser 725 at approximately 43.5° F. where it condenses the third working fluid from third stage evaporator 716. The cold sea water exits the second stage condenser 725 at a temperature approximately 46.9° F. and flows up to the third stage condenser.

The cold sea water enters the third stage condenser 726 at a temperature of approximately 46.9° F. where it condenses the second working fluid from second stage evaporator 715. The cold sea water exits the third stage condenser 726 at a temperature approximately 50.4° F.

The cold sea water then flows up from the third stage condenser 726 to the fourth stage condenser 727, entering at a temperature of approximately 50.4° F. In the fourth stage condenser, the cold sea water condenses the first working fluid from first stage evaporator 714. The cold sea water then exits the fourth stage condenser at a temperature of approximately 54.0° F. and ultimately discharges from the vessel. The cold sea water discharge can be directed to a thermal layer at an ocean depth of or approximately the same temperature as the discharge temperature of the cold sea water. Alternately, the portion of the power plant housing the multistage condenser can be located at a depth within the structure so that the cold sea water is discharged to an appropriate ocean thermal layer.

The first working fluid enters the first stage evaporator 714 at a temperature of 56.7° F. where it is heated to a vapor with a temperature of 74.7° F. The first working fluid then flows to first turbine 731 and then to the fourth stage condenser 727 where the first working fluid is condensed to a liquid with a temperature of approximately 56.5° F. The liquid first working fluid is then pumped via first working fluid pump 741 back to the first stage evaporator 714.

The second working fluid enters the second stage evaporator 715 at a temperature approximately 53.0° F. where it is heated to a vapor. The second working fluid exits the second stage evaporator 715 at a temperature approximately 72.4° F. The second working fluid then flow to a second turbine 732 and then to the third stage condenser 726. The second working fluid exits the third stage condenser at a temperature approximately 53.0° F. and flows to working fluid pump 742, which in turn pumps the second working fluid back to the second stage evaporator 715.

The third working fluid enters the third stage evaporator 716 at a temperature approximately 49.5° F. where it will be heated to a vapor and exit the third stage evaporator 716 at a temperature of approximately 70.2° F. The third working fluid then flows to third turbine 733 and then to the second stage condenser 725 where the third working fluid is condensed to a fluid at a temperature approximately 49.5° F. The third working fluid exits the second stage condenser 725 and is pumped back to the third stage evaporator 716 via third working fluid pump 743.

The fourth working fluid enters the fourth stage evaporator 717 at a temperature of approximately 46.0° F. where it will be heated to a vapor. The fourth working fluid exits the fourth stage evaporator 717 at a temperature approximately 68.0° F. and flow to a fourth turbine 734. The fourth working fluid exits fourth turbine 734 and flows to the first stage condenser 724 where it is condensed to a liquid with a temperature approximately 46.0° F. The fourth working fluid exits the first stage condenser 724 and is pumped back to the fourth stage evaporator 717 via fourth working fluid pump 744.

The first turbine 731 and the fourth turbine 734 cooperatively drive a first generator 751 and form first turbo-generator pair 761. First turbo-generator pair will produce approximately 25 MW of electric power.

The second turbine 732 and the third turbine 733 cooperatively drive a second generator 752 and form second turbo-generator pair 762. Second turbo-generator pair 762 will produce approximately 25 MW of electric power.

The four stage hybrid cascade heat exchange cycle of FIG. 7 allows the maximum amount of energy to be extracted from the relatively low temperature differential between the warm sea water and the cold sea water. Moreover, all heat exchangers can directly support turbo-generator pairs that produce electricity using the same component turbines and generators.

It will be appreciated that multiple multi-stage hybrid cascading heat exchangers and turbo generator pairs can be incorporated into a vessel or platform design.

Example 2

An offshore OTEC spar platform includes four separate power modules, each generating about 25 MWe Net at the rated design condition. Each power module comprises four separate power cycles or cascading thermodynamic stages that operate at different pressure and temperature levels and pick up heat from the sea water system in four different stages. The four different stages operate in series. The approximate pressure and temperature levels of the four stages at the rated design conditions (Full Load—Summer Conditions) are:

|  | Turbine inlet Pressure/Temp. (Psia)/(° F.) | Condenser Pressure/Temp. (Psia)/(° F.) |
| --- | --- | --- |
| 1 Stage | 137.9/74.7 | 100.2/56.5 |
| 2" Stage | 132.5/72.4 | 93.7/53 |
| 3' Stage | 127.3/70.2 | 87.6/49.5 |
| 4" Stage | 122.4/68 | 81.9/46 |

The working fluid is boiled in multiple evaporators by picking up heat from warm sea water (WSW). Saturated vapor is separated in a vapor separator and led to an ammonia turbine by STD schedule, seamless carbon steel pipe. The liquid condensed in the condenser is pumped back to the evaporator by 2×100% electric motor driven constant speed feed pumps. The turbines of cycle-1 and 4 drive a common electric generator. Similarly the turbines of cycle-2 and 3 drive another common generator. In an aspect there are two generators in each plant module and a total of 8 in the 100 MWe plant. The feed to the evaporators is controlled by feed control valves to maintain the level in the vapor separator. The condenser level is controlled by cycle fluid make up control valves. The feed pump minimum flow is ensured by recirculation lines led to the condenser through control valves regulated by the flow meter on the feed line.

In operation the four (4) power cycles of the modules operate independently. Any of the cycles can be shutdown without hampering operation of the other cycles if needed, for example in case of a fault or for maintenance. But that will reduce the net power generation of the power module as a whole module.

Aspects of the present invention require large volumes of seawater. There will be separate systems for handling cold and warm seawater, each with its pumping equipment, water ducts, piping, valves, heat exchangers, etc. Seawater is more corrosive than fresh water and all materials that may come in contact with it need to be selected carefully considering this. The materials of construction for the major components of the seawater systems will be:

Large bore piping: Fiberglass Reinforced Plastic (FRP)
Large seawater ducts & chambers: Epoxy-coated carbon steel
Large bore valves: Rubber lined butterfly type
Pump impellers: Suitable bronze alloy Unless controlled by suitable means, biological growths inside the seawater systems can cause significant loss of plant performance and can cause fouling of the heat transfer surfaces leading to lower outputs from the plant. This internal growth can also increase resistance to water flows causing greater pumping power requirements, lower system flows, etc. and even complete blockages of flow paths in more severe cases.

The Cold Sea Water ("CSW") system using water drawn in from deep ocean should have very little or no bio-fouling problems. Water in those depths does not receive much sunlight and lack oxygen, and so there are fewer living organisms in it. Some types of anaerobic bacteria may, however, be able to grow in it under some conditions. Shock chlorination will be used to combat bio-fouling.

The Warm Sea Water ("WSW") system handling warm seawater from near the surface will have to be protected from bio-fouling. It has been found that fouling rates are much lower in tropical open ocean waters suitable for OTEC operations than in coastal waters. As a result, chemical agents can be used to control bio-fouling in OTEC systems at very low doses that will be environmentally acceptable. Dosing of small amounts of chlorine has proved to be very effective in combating bio-fouling in seawater. Dosages of chlorine at the rate of about 70 ppb for one hour per day, is quite effective in preventing growth of marine organisms. This dosage rate is only 1/20th of the environmentally safe level stipulated by EPA. Other types of treatment (thermal shock, shock chlorination, other biocides, etc.) can be used from time to time in-between the regimes of the low dosage treatment to get rid of chlorine-resistant organisms.

Necessary chlorine for dosing the seawater streams is generated on-board the plant ship by electrolysis of seawater. Electro-chlorination plants of this type are available commercially and have been used successfully to produce hypochlorite solution to be used for dosing. The electro-chlorination plant can operate continuously to fill-up storage tanks and contents of these tanks are used for the periodic dosing described above.

All the seawater conduits avoid any dead pockets where sediments can deposit or organisms can settle to start a colony. Sluicing arrangements are provided from the low points of the water ducts to blow out the deposits that may get collected there. High points of the ducts and water chambers are vented to allow trapped gases to escape.

The Cold Seawater (CSW) system will consist of a common deep water intake for the plant ship, and water pumping/distribution systems, the condensers with their associated water piping, and discharge ducts for returning the water back to the sea. The cold water intake pipe extends down to a depth of more than 2700 ft, (e.g., between 2700 ft to 4200 ft), where the sea water temperature is approximately a constant 40° F. Entrance to the pipe is protected by screens to stop large organisms from being sucked in to it. After entering the pipe, cold water flows up towards the sea surface and is delivered to a cold well chamber near the bottom of the vessel or spar.

The CSW supply pumps, distribution ducts, condensers, etc. are located on the lowest level of the plant. The pumps take suction from the cross duct and send the cold water to the distribution duct system. 4×25% CSW supply pumps are provided for each module. Each pump is independently circuited with inlet valves so that they can be isolated and opened up for inspection, maintenance, etc. when required. The pumps are driven by high-efficiency electric motors.

The cold seawater flows through the condensers of the cycles in series and then the CSW effluent is discharged back to the sea. CSW flows through the condenser heat exchangers of the four plant cycles in series in the required order. The condenser installations are arranged to allow them to be isolated and opened up for cleaning and maintenance when needed.

The WSW system comprises underwater intake grills located below the sea surface, an intake plenum for conveying the incoming water to the pumps, water pumps, biocide dosing system to control fouling of the heat transfer surfaces, water straining system to prevent blockages by suspended materials, the evaporators with their associated water piping, and discharge ducts for returning the water back to the sea.

Intake grills are provided in the outside wall of the plant modules to draw in warm water from near the sea surface. Face velocity at the intake grills is kept to less than 0.5 ft/sec. to minimize entrainment of marine organisms. These grills also prevent entry of large floating debris and their clear openings are based on the maximum size of solids that can pass through the pumps and heat exchangers safely. After passing through these grills, water enters the intake plenum located behind the grills and is routed to the suctions of the WSW supply pumps.

The WSW pumps are located in two groups on opposite sides of the pump floor. Half of the pumps are located on each side with separate suction connections from the intake plenum for each group. This arrangement limits the maximum flow rate through any portion of the intake plenum to about 1/16th of the total flow and so reduces the friction losses in the intake system. Each of the pumps are provided with valves on inlet sides so that they can be isolated and opened up for inspection, maintenance, etc. when required. The pumps are driven by high-efficiency electric motors with variable frequency drives to match pump output to load.

It is necessary to control bio-fouling of the WSW system and particularly its heat transfer surfaces, and suitable biocides will be dosed at the suction of the pumps for this.

The warm water stream may need to be strained to remove the larger suspended particles that can block the narrow passages in the heat exchangers. Large automatic filters or 'Debris Filters' can be used for this if required. Suspended materials can be retained on screens and then removed by backwashing. The backwashing effluents carrying the suspended solids will be routed to the discharge stream of the plant to be returned to the ocean. The exact requirements for this will be decided during further development of the design after collection of more data regarding the seawater quality.

The strained warm seawater (WSW) is distributed to the evaporator heat exchangers. WSW flows through the evaporators of the four plant cycles in series in the required order. WSW effluent from the last cycle is discharged at a depth of approximately 175 feet or more below the sea surface. It then sinks slowly to a depth where temperature (and therefore density) of the seawater will match that of the effluent.

Additional Aspects:

The baseline cold water intake pipe is a staved, segmented, pultruded fiber reinforced vinyl ester pipe. Staved cold water pipe construction is described in U.S. patent application Ser. No. 12/691,663 entitled Ocean Thermal Energy Conversion Cold Water Pipe, filed simultaneously with the present application and incorporated herein by reference in it's entirety. In an exemplary embodiment, each stave segment can be 40 ft-60 ft long. Stave segments can be joined by staggering staves to create an interlocking seam. Pipe staves can be extruded in panels up to 120 inches wide and at least 40 feet in length and can incorporate e-glass or s-glass with polyurethane, polyester, or vinyl ester resin. In some aspects, the stave segments can be concrete. Staves can be solid construction. The staves can be a cored or honeycombed construction. The staves will be designed to interlock with each other and at the ends of the staves will be staggered there by eliminating the use of flanges between sections of the cold water pipe. In an aspect the staves can be 40-ft long and staggered by 5-ft and 10-ft where the pipe sections are joined. The staves and pipe sections can be bonded together, e.g., using polyurethane or polyester adhesive. 3-M and other companies make suitable adhesives. If sandwich construction is utilized, Polycarbonate foam or syntactic foam could be used as the core material. Spider cracking is to be avoided and the use of polyurethane helps to provide a reliable design.

In an aspect the envisioned CWP is continuous, i.e. it does not have flanges between sections.

The CWP will be connected to the spar via a spherical bearing joint. Cold water pipe connections in OTEC applications are described in Section 4.5 of Avery & Wu, "Renewable Energy from the Ocean, a Guide to OTEC," Oxford University Press, 1994, incorporated herein by reference in its entirety. One of the significant advantages of using the spar buoy as the platform is that doing so results in relatively small rotations between the spar itself and the CWP even in the most severe 100-year storm conditions. In addition the vertical and lateral forces between the spar and the CWP are such that the downward force between the spherical ball and its seat keeps the bearing surfaces in contact at all times. Because this bearing, that also acts as the water seal, does not come out of contact with its mating spherical seat there is no need to install a mechanism to hold the CWP in place vertically. This helps to simplify the spherical bearing design and also minimizes the pressure losses that would otherwise be caused by any additional CWP pipe restraining structures or hardware. The lateral forces transferred through the spherical bearing are also low enough that they can be adequately accommodated without the need for vertical restraint of the CWP.

Though embodiments herein have described multi-stage heat exchanger in a floating offshore vessel or platform, it will be appreciated that other embodiments are within the scope of the invention. For example, the multi-stage heat exchanger and integrated flow passages can be incorporated into shore based facilities including shore based OTEC facilities. Moreover, the warm water can be warm fresh water, geo-thermally heated water, or industrial discharge water (e.g., discharged cooling water from a nuclear power plant or other industrial plant). The cold water can be cold fresh water. The OTEC system and components described herein can be used for electrical energy production or in other fields of use including: salt water desalination: water purification; deep water reclamation; aquaculture; the production of biomass or biofuels; and still other industries.

All references mentioned herein are incorporated by reference in their entirety.

Other embodiments are within the scope of the following claims.

What is claimed is:

1. An offshore power generation structure comprising:
    a submerged portion comprising;
        a first deck portion comprising an integral multi-stage evaporator system including a first stage evaporator, a second stage evaporator, a third stage evaporator, and a fourth stage evaporator arranged such that a warm water outlet of the first stage evaporator discharges to a warm water inlet of the second stage evaporator, a warm water outlet of the second stage evaporator discharges to a warm water inlet of the third stage evaporator, and a warm water outlet of the third stage evaporator discharges to a warm water inlet of the fourth stage evaporator;
        a second deck portion comprising an integral multi-stage condensing system including a first stage condenser, a second stage condenser, a third stage condenser, and a fourth stage condenser arranged such that a cooling water outlet of the first stage condenser discharges to a cooling water inlet of the second stage condenser, a cooling water outlet of the second stage condenser discharges to a cooling water inlet of the third stage condenser, and a cooling water outlet of the third stage condenser discharges to a cooling water inlet of the fourth stage condenser;
        a working fluid;
        a first working fluid loop extending between the first stage evaporator and the fourth stage condenser, the first working fluid loop containing a portion of the working fluid;
        a second working fluid loop extending between the second stage evaporator and the third stage condenser, the second working fluid loop containing a portion of the working fluid;
        a third working fluid loop extending between the third stage evaporator and the second stage condenser, the third working fluid loop containing a portion of the working fluid; and
        a fourth working fluid loop extending between the fourth stage evaporator and the first stage condenser; the fourth working fluid loop containing a portion of the working fluid;
        a third deck portion housing mechanical and electrical equipment;
        a cold water pipe; and
        a cold water pipe connection.

2. The offshore power generation structure of claim 1, wherein the evaporators of the integral multi-stage evaporator system are vertically aligned in series so that the warm water flows between stages with minimal pressure losses due to elimination of connective piping.

3. The offshore power generation structure of claim 1, wherein the condensers of the integral multi-stage condensing system are vertically aligned in series so that the cold water flows between stages with minimal pressure losses due to elimination of connective piping.

4. The offshore power generation structure of claim 1, wherein the first deck portion comprises a warm water conduit that forms a structural member of the submerged portion.

5. The offshore power generation structure of claim 1, wherein the second deck portion comprises a cold water conduit that forms a structural member of the submerged portion.

6. The offshore power generation structure of claim 1, wherein warm water flows through the first deck portion and the multi-stage evaporator system in the same direction as natural convection of the cooling warm water.

7. The offshore power generation structure of claim 1, wherein cold water flows through the second deck portion and the multi-stage condensing system in the same direction as natural convection of the warming cold water.

8. The offshore power generation structure of claim 1, wherein the first deck portion is above the third deck portion which is above the second deck portion.

9. The offshore power generation structure of claim 1, wherein the warm water flows between 500,000 and 6,000,000 gpm.

10. The offshore power generation structure of claim 1 comprising a floating spar.

11. The offshore power generation structure of claim 1 comprising an Ocean Thermal Energy Conversion system.

12. An offshore power generation structure comprising a submerged portion, the submerged portion of the offshore power generation structure comprising;
　a first deck portion comprising an integral multi-stage evaporator system comprising:
　　a first stage warm water structural passage forming a high volume warm water conduit and having a first stage warm water discharge;
　　a first stage working fluid passage arranged in cooperation with the first stage warm water structural passage to warm a first working fluid to a vapor;
　　a second stage warm water structural passage forming a high volume warm water conduit and having a second stage warm water intake and a second stage warm water discharge; the second stage warm water intake coupled to the first stage warm water discharge;
　　a second stage working fluid passage arranged in cooperation with the second stage warm water structural passage to warm a second working fluid to a vapor;
　　a third stage warm water structural passage forming a high volume warm water conduit and having a third stage warm water intake and a third stage warm water discharge; the third stage warm water intake coupled to the second stage warm water discharge;
　　a third stage working fluid passage arranged in cooperation with the third stage warm water structural passage to warm a third working fluid to a vapor;
　　a fourth stage warm water structural passage forming a high volume warm water conduit and having a fourth stage warm water intake; the fourth stage warm water intake coupled to the third stage warm water discharge; and
　　a fourth stage working fluid passage arranged in cooperation with the fourth stage warm water structural passage to warm a fourth working fluid to a vapor;
　a second deck portion comprising an integral multi-stage condensing system, comprising:
　　a first stage cold water structural passage forming a high volume cold water conduit and having a first stage cold water intake and a first stage cold water discharge;
　　a first stage working fluid passage in communication with the fourth stage working fluid passage of the first deck portion, wherein the first stage working fluid passage of the second deck portion in cooperation with the first stage cold water structural passage cools the fourth working fluid to a liquid;
　　a second stage cold water structural passage forming a high volume cold water conduit having a second stage cold water intake wherein the first stage cold water discharge and the second stage cold water intake are arranged to provide minimal pressure loss in the cold water flow from the first stage cold water discharge to the second stage cold water intake;
　　a second stage working fluid passage in communication with the third stage working fluid passage of the first deck portion, wherein the second stage working fluid passage in cooperation with the second stage cold water structural passage cool the third working fluid to a liquid;
　a third deck portion housing power generation equipment, comprising;
　　a first turbine and second turbine, wherein the first stage working fluid passage of the first deck portion is in communication with the first turbine and the second stage working fluid passage of the first deck portion is in communication with the second turbine;
　wherein the first, second, third, and fourth working fluid comprise a single type of fluid.

13. The offshore power generation structure of claim 12 wherein the structure is a spar.

14. The offshore power generation structure of claim 12 wherein the structure comprises an OTEC power generation system.

15. An offshore power generation structure comprising a submerged portion, the submerged portion further comprising:
　a four stage evaporator portion integral with a warm water conduit comprising
　　a first stage evaporator heat exchange surface in contact with a first working fluid, the first evaporator heat exchange surface discharging to a second stage evaporator heat exchange surface;
　　the second stage evaporator heat exchange surface in contact with a second working fluid, the second evaporator heat exchange surface discharging to a third stage evaporator heat exchange surface;
　　the third stage evaporator heat exchange surface in contact with a third working fluid, the third evaporator heat exchange surface discharging to a fourth stage evaporator heat exchange surface;
　　the fourth stage evaporator heat exchange surface in contact with a fourth working fluid;
　a four stage condenser portion integral with a cold water conduit,
　a power generation portion,
　a cold water pipe connection, and
　a cold water pipe;
　wherein the first and fourth working fluids are in communication with a first turbo generator and the second and third working fluids are in communication with a second turbo generator; and
　wherein the first, second, third, and fourth working fluid comprise a single type of fluid.

16. The offshore power generation structure of claim 15 wherein the warm water conduit comprises a structural member of the submerged portion.

17. The offshore power generation structure of claim 15, wherein the four stage condenser portion with the cold water conduit comprises:
　a first stage condenser heat exchange surface in contact with the fourth working fluid, the first heat condenser exchange surface discharging to a second stage condenser heat exchange surface;
　the second stage condenser heat exchange surface in contact with the third working fluid, the second condenser heat exchange surface discharging to a third stage condenser heat exchange surface;

the third stage condenser heat exchange surface in contact with the second working fluid, the third condenser heat exchange surface discharging to a fourth stage condenser heat exchange surface;

the fourth stage condenser heat exchange surface in contact with the first working fluid.

18. The offshore power generation structure of claim 12, wherein the integral multi-stage condensing system further comprises:

a third stage cold water structural passage forming a high volume cold water conduit having a third stage cold water intake wherein the second stage cold water discharge and the third stage cold water intake are arranged to provide minimal pressure loss in the cold water flow from the second stage cold water discharge to the third stage cold water intake;

a third stage working fluid passage in communication with the second stage working fluid passage of the first deck portion, wherein the third stage working fluid passage in cooperation with the third stage cold water structural passage cool the second working fluid to a liquid;

a fourth stage cold water structural passage forming a high volume cold water conduit having a fourth stage cold water intake wherein the third stage cold water discharge and the fourth stage cold water intake are arranged to provide minimal pressure loss in the cold water flow from the third stage cold water discharge to the fourth stage cold water intake; and a fourth stage working fluid passage in communication with the first stage working fluid passage of the first deck portion, wherein the fourth stage working fluid passage in cooperation with the fourth stage cold water structural passage cool the first working fluid to a liquid.

19. The offshore power generation structure of claim 1, wherein each of the first, second, third, and fourth working fluid loops comprises a turbine.

20. The offshore power generation structure of claim 19, wherein the turbine of each of the first, second, third, and fourth working fluid loops comprises an ammonia turbine.

21. The offshore power generation structure of claim 19, wherein the turbine of each of the first, second, third, and fourth working fluid loops have identical performance specifications.

22. The offshore power generation structure of claim 12, wherein the first turbine comprises a first ammonia turbine and the second turbine comprises a second ammonia turbine.

23. The offshore power generation structure of claim 12, wherein the first turbine and the second turbine have identical performance specifications.

24. The offshore power generation structure of claim 12, wherein the first turbo generator and the second turbo generator have identical performance specifications.

* * * * *